United States Patent
Futaki

(10) Patent No.: US 9,414,341 B2
(45) Date of Patent: Aug. 9, 2016

(54) RADIO STATION, RADIO TERMINAL, AND SYNCHRONIZATION TIMER CONTROL METHOD IN RADIO COMMUNICATION SYSTEM

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/595,300

(22) Filed: Jan. 13, 2015

(65) Prior Publication Data

US 2015/0146701 A1    May 28, 2015

Related U.S. Application Data

(63) Continuation of application No. 14/235,723, filed as application No. PCT/JP2012/004503 on Jul. 12, 2012, now Pat. No. 8,989,013.

(30) Foreign Application Priority Data

Jul. 29, 2011    (JP) .................. 2011-167802

(51) Int. Cl.
*H04B 7/212* (2006.01)
*H04J 3/00* (2006.01)
(Continued)

(52) U.S. Cl.
CPC ....... *H04W 56/0005* (2013.01); *H04J 11/0069* (2013.01); *H04L 5/0032* (2013.01); *H04W 56/0045* (2013.01)

(58) Field of Classification Search
CPC ............ H04W 24/02; H04W 56/0005; H04W 56/001; H04W 56/0045; H04W 72/0406; H04W 72/0413; H04W 74/002; H04W 74/004; H04W 56/005; H04W 56/004; H04W 56/0055; H04J 11/0069; H04J 2011/0096; H04L 5/001; H04L 5/0032; H04L 5/0048; H04L 5/0098; H04L 1/1851; H04L 1/1883; H04L 11/0069
USPC .......... 370/235–240, 252, 310–350, 503–522
See application file for complete search history.

(56) References Cited

U.S. PATENT DOCUMENTS

| 8,395,985 | B2 * | 3/2013 | Dinan ............... | H04W 72/0453 370/206 |
| 8,699,317 | B2 * | 4/2014 | Dinan ............... | H04W 72/0453 370/206 |

(Continued)

FOREIGN PATENT DOCUMENTS

WO    WO 2011/085200 A1    7/2011

OTHER PUBLICATIONS

Panasonic, "Time Alignment in case of multiple TA", 3GPP TSG-RAN WG2 Meeting, R2-112819, Barcelona, Spain, May 2011.

(Continued)

*Primary Examiner* — Tri H Phan
(74) *Attorney, Agent, or Firm* — Finnegan, Henderson, Farabow, Garrett & Dunner LLP

(57) ABSTRACT

A radio station, a radio terminal, and a method for synchronization timer control are provided that can reduce a delay as much as possible until uplink signal resynchronization is done in a case where a plurality of cell groups exist. In a radio communication system having a function of using a plurality of radio resources corresponding to a plurality of cells, respectively, for communication between a radio station (10) and a radio terminal (20), the radio terminal is provided with a plurality of synchronization timers for determining whether or not uplink signals in individual cell groups are in synchronization, wherein the synchronization timers are provided respectively for the plurality of cell groups each including at least one cell, and at the radio terminal (20), uplink-signal transmission on the cells included in a second cell group is controlled depending on a state of a first synchronization timer provided correspondingly for a first cell group including a specific cell and on a state of a second synchronization timer provided correspondingly for the second cell group other than the first cell group, wherein the first synchronization timer and the second synchronization timer are controlled independently.

26 Claims, 16 Drawing Sheets

(51) Int. Cl.
*H04J 3/06* (2006.01)
*H04W 56/00* (2009.01)
*H04J 11/00* (2006.01)
*H04L 5/00* (2006.01)

(56) References Cited

U.S. PATENT DOCUMENTS

| | | | | |
|---|---|---|---|---|
| 8,934,438 | B2* | 1/2015 | Dinan | H04W 56/00 370/329 |
| 8,967,765 | B2* | 3/2015 | Miyazawa | B41J 2/16547 347/29 |
| 9,084,195 | B2* | 7/2015 | Sebire | H04W 56/0045 |
| 2011/0243102 | A1 | 10/2011 | Sebire et al. | |
| 2012/0257570 | A1* | 10/2012 | Jang | H04L 1/1854 370/328 |
| 2012/0287865 | A1 | 11/2012 | Wu et al. | |
| 2013/0021979 | A1* | 1/2013 | Kwon | H04W 56/0045 370/328 |
| 2013/0028185 | A1* | 1/2013 | Wu | H04W 56/0045 370/328 |
| 2013/0034087 | A1* | 2/2013 | Kwon | H04W 56/0005 370/336 |
| 2013/0182687 | A1 | 7/2013 | Ng et al. | |
| 2013/0315214 | A1 | 11/2013 | Bai et al. | |
| 2014/0029575 | A1 | 1/2014 | Zeng et al. | |
| 2014/0092812 | A1* | 4/2014 | Jang | H04W 56/0045 370/328 |
| 2014/0161110 | A1 | 6/2014 | Kim et al. | |
| 2014/0219185 | A1 | 8/2014 | Etemad et al. | |
| 2014/0228013 | A1* | 8/2014 | Yang | H04W 56/0045 455/418 |

OTHER PUBLICATIONS

3GPP TS 36.300 v10.3.0 (the Internet <URL> http:www.3gpp.org/ftp/Specs/html-info/36300.htm), Sections 5.5, 6.4, and 7.5.
3GPP TS 36.321 v10.1.0 (the Internet <URL> http:www.3gpp.org/ftp/Specs/html-info/36321.htm), Section 5.2.
InterDigital Communications, "Support for multiple Timing Advance in LTE CA", 3GPP TSG-RAN WG2, Tdoc, R2-113255, Barcelona, Spain, May 2011.
Intel Corporation, "Configuration of multiple TA in Rel-11 CA," 3GPP TSG RAN2, Meeting, R2-113215, Barcelona, Spain, May 2011.
Alcatel-Lucent et al., "Maintaining UL Synchronization for deactivated SCell", TSG-RAN WG2, R2-113234, Barcelona, Spain, May 2011.
Renesas Electronics Europe, "Discussion on Multiple Timing Advance", 3GPP TSG-RAN WG2, Meeting, RS-111982, Shanghai, China, Apr. 2011.
International Search Report mailed Aug. 14, 2012.
Itri, "Considerations on TAT for Multiple TAs", 3GPP TSG RAN WG2 #74, R2-113193, $3^{rd}$ Generation Partnership Project (3GPP), Mobile Competence Centre, 650, Route Des Lucioles, F-06921 Sophia-Antipolis Cedes, May 2011.
Extended European Search Report mailed on Feb. 5, 2015 by the European Patent Office in counterpart European Patent Application No. 12820761.0.

* cited by examiner

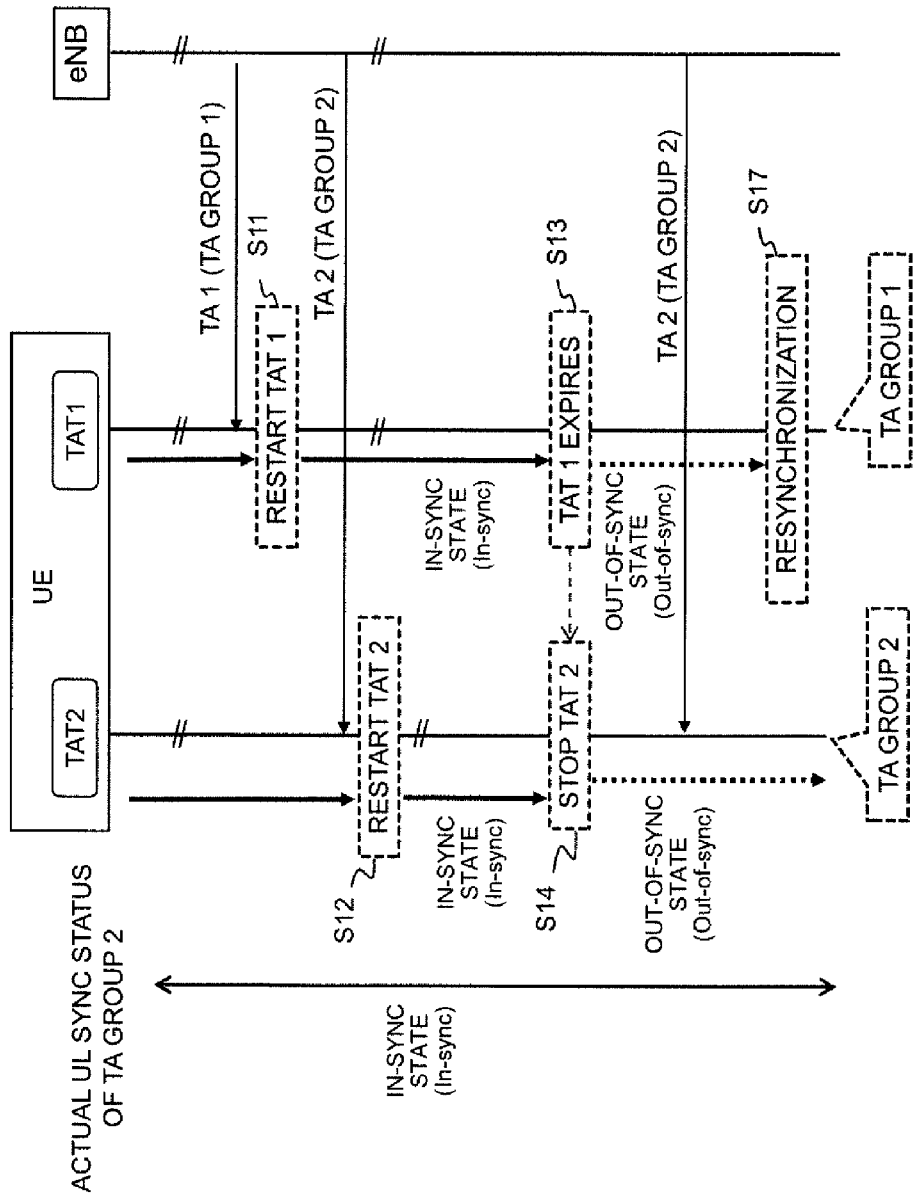

RADIO STATION, RADIO TERMINAL, AND SYNCHRONIZATION TIMER CONTROL METHOD IN RADIO COMMUNICATION SYSTEM

CROSS-REFERENCE TO RELATED PATENT APPLICATIONS

This application is a continuation of U.S. patent application Ser. No. 14/235,723, filed on Jan. 28, 2014, which is a National Stage Entry of International Application No. PCT/JP2012/004503, filed Jul. 12, 2012, which claims priority from Japanese Patent Application No. 2011-167802, filed Jul. 29, 2011. The entire contents of the above-referenced applications are expressly incorporated herein by reference.

TECHNICAL FIELD

The present invention relates to a radio communication system in which a radio terminal has a function of transmitting signals on multiple carriers or multiple cells at the same time and, more particularly, to a radio station, a radio terminal, and a synchronization timer control method in the radio communication system.

BACKGROUND ART

In LTE (Long Term Evolution), which is one of the standards for radio communication systems defined by 3GPP (3rd Generation Partnership Project), radio resources including a time domain and a frequency domain are assigned to each radio terminal (User Equipment: UE) by using the TDM (Time Domain Multiplexing)/FDM (Frequency Domain Multiplexing) scheme. With respect to uplink signals transmitted by multiple radio terminals to a radio base station (enhanced Node B: eNB) in particular, the radio base station controls the transmission timing of an uplink signal of each radio terminal so that it is accommodated within a predetermined receive window at the radio base station. This control of uplink-signal transmission timing is performed by using the following two (NPL 1).

Uplink-signal transmission timing adjustment value (Timing Advance: TA)
Uplink-signal synchronization timer (Time Alignment Timer: TAT)

The transmission timing adjustment value TA is information indicating a value for a radio terminal to advance or delay the current transmission timing by a predetermined amount. The synchronization timer TAT indicates a duration for which the timing of receiving an uplink signal at a radio base station is accommodated within a predetermined window, that is, uplink-signal synchronization is guaranteed, with a transmission timing currently configured. The radio terminal is enabled to transmit uplink signals while the synchronization timer TAT is running, but does not transmit (is disabled to transmit) uplink signals when the synchronization timer TAT expires.

Moreover, in LTE-Advanced (LTE-A), which is a radio communication system advanced from LTE, the standardization of carrier aggregation (CA) is being proceeded, in which radio terminals use multiple component carriers (CC) at the same time to transmit and receive user data and the like (NPL 2). Each component carrier CC corresponds to one system bandwidth defined in LTE and can be thought to correspond to one cell. That is, a downlink component carrier CC and a corresponding uplink component carrier CC in combination are thought to be one cell. For example, transmission and reception on two downlink (or uplink) component carriers CC can be translated to transmission and reception on two cells. Accordingly, communication using a single uplink/downlink component carrier CC corresponds to communication on a single cell, and in the description hereinafter, both or one of the component carrier and the cell will be used appropriately.

Here, a component carrier CC that performs the most basic functions such as obtaining system information required for a radio terminal to communicate with a radio base station, is referred to as primary component carrier (Primary CC: PCC) or primary cell (PCell), and other component carriers are referred to as secondary component carrier (Secondary CC: SCC) or secondary cell (SCell).

In LTE-A, studies have hitherto been proceeded on the premise that when carrier aggregation CA is performed, common uplink-signal transmission timing is used on multiple component carriers CC or multiple cells. That is, even when uplink signals are transmitted by using multiple component carriers (multiple cells corresponding thereto), there is one uplink transmission timing adjustment value TA that a radio base station notifies to a radio terminal at certain time, and there also is one synchronization timer TAT for each radio terminal. Thereby, it is possible to easily perform uplink-signal transmission timing control without complicating the control even when carrier aggregation CA is performed.

On the other hand, in 3GPP, studies of a technology improved from the technology standardized as LTE-A have been started. Specifically, the technology has been discussed that makes carrier aggregation CA feasible even if uplink-signal transmission timing differs between a plurality of component carriers CC, that is, a plurality of cells. Factors causing uplink-signal transmission timing to differ between a plurality of component carriers CC (a plurality of cells) are different frequency bands, a repeater (repeating station) being set for each frequency band (or only for a specific frequency band), and the like.

In 3GPP, a group of one or a plurality of component carriers (cells) on which uplink-signal transmission timing can be controlled in common is referred to as synchronization group (Timing Advance Group: TA Group). NPL 3 proposes a method for controlling synchronization timers, in which the uplink-signal transmission timing adjustment value TA is controlled for each such TA Group on which timing control can be performed in common, and in which one synchronization timer TAT is maintained also for each TA Group.

Hereinafter, a brief description will be given of a method for controlling synchronization timers in a case where uplink-signal transmission timing differs between a plurality of component carriers CC (a plurality of cells), with reference to FIGS. 1 to 3.

Referring to FIG. 1, a system will be considered in which two TA Groups 1 and 2 with different uplink-signal transmission timings exist. Here, it is assumed that a primary cell PCell and a secondary cell SCell1 belong to the same TA Group 1, and secondary cells SCell2 and SCell3 belong to the same TA Group 2 as shown in FIG. 2A, and that to a radio base station eNB, a radio terminal UE performs uplink transmission by using the three secondary cells SCell1-3 in addition to the primary cell PCell. In this case, since uplink transmission timing differs between the TA Groups 1 and 2, uplink transmission timing adjustment values TA1 and TA2 for the respective TA Groups are configured so that uplink signal reception timing at the radio base station eNB will be accommodated within a predetermined window as shown in FIG. 2B.

Moreover, referring to FIG. 3, according to NPL 3, a radio terminal UE controls a synchronization timer TAT1, linking it with uplink-signal transmission timing control on the TA Group 1, and similarly controls a synchronization timer TAT2, linking it with uplink-signal transmission timing control on the TA Group 2. That is, when uplink-signal synchronization is established in the individual TA Groups (TA Groups 1 and 2), the respective corresponding synchronization timers TAT1 and TAT2 are started, and each time transmission timing adjustment values TA1 and TA2 are received while the synchronization timers TAT1 and TAT2 are running for the respective TA Groups, the synchronization timers TAT1 and TAT2 are restarted (restarted from a set value) (Steps S11 and S12). According to this timer control, the radio terminal UE can determine whether or not uplink-signal synchronization in each TA Group is guaranteed.

Moreover, it is proposed that when the synchronization timer TAT1 for the TA Group 1 expires (Step S13), the synchronization timer TAT2 is stopped (Step S14) even if the synchronization timer TAT2 is running at that time, that is, even if uplink signals in the TA Group 2 are in synchronization. This proposal is based on the restriction according to CA in LTE-A that a radio terminal UE can transmit uplink control signals (Physical Uplink Control Channel: PUCCH) only on the primary cell. That is, when an uplink signal on the primary cell, on which uplink control signals (PUCCH) can be transmitted, is not in synchronization, a radio terminal UE should stop transmission of all uplink signals, and the proposal aims to easily implement this by configuring the synchronization timer TAT2 to be stopped upon expiry of the synchronization timer TAT1.

Note that after the synchronization timer TAT2 is stopped, the radio terminal UE does not restart the synchronization timer TAT2 even when a transmission timing adjustment value TA2 for the TA Group 2 is received. Thereby, it is possible to avoid a situation where the radio terminal UE transmits an uplink signal in the TA Group 2 when the synchronization timer TAT1 expires but the synchronization timer TAT2 is running.

CITATION LIST

Patent Literature

[NPL 1]
3GPP TS 36.321 v10.1.0 (the Internet <URL> http://www.3gpp.org/ftp/Specs/html-info/36321.htm), Section 5.2
[NPL 2]
3GPP TS 36.300 v10.3.0 (the Internet <URL> http://www.3gpp.org/ftp/Specs/html-info/36300.htm), Sections 5.5, 6.4, and 7.5
[NPL 3]
3GPP RAN WG2 Contribution, R2-112819 (the Internet <URL> http:www.3gpp.org/ftp/tsg_ran/WG2_RL2/TSGR2_74/Docs/R2-112819.zip)

SUMMARY OF INVENTION

Technical Problem

According to the above-described synchronization timer control in LTE, when the synchronization timer TAT1 for the TA Group 1 including the primary cell expires, the synchronization timer TAT 2 for the TA Group 2 is stopped. However, the carrier aggregation (CA) that is currently considered in 3GPP premises that processing for establishing synchronization cannot be performed in parallel in a plurality of TA Groups. Therefore, if uplink signal resynchronization is required at least on a cell of the TA Group 1 including the primary cell and further uplink signal resynchronization is also required on a cell of the TA Group 2, resynchronization in the TA Group 1 is first completed, and thereafter resynchronization in the TA Group 2 is started. Accordingly, resynchronization operation in the TA Group 2 is started after as long a delay as the time required for resynchronization in the TA Group 1. The time required for resynchronization in a TA Group is assumed to be about 20 msec (or more). Since this delay time increases proportionately with the number of TA Groups and greatly lowers the transmission rate (throughput) of a radio terminal, it is preferable to make this delay time as short as possible. Note that an assumable case where resynchronization is required in both the TA Groups 1 and 2 is that, for example, carrier aggregation (CA) is required (CA is preferred) because a radio terminal UE is executing an application or the like that performs data transmission on a one-shot basis and data to be transmitted at a time has a large size.

As described above, in order to avoid a decrease in the throughput of a radio terminal, it is important to avoid a delay in the completion of resynchronization in another TA Group occurring when the synchronization timer TAT1 for the TA Group 1 including the primary cell expires and synchronization is lost.

Accordingly, an object of the present invention is to provide a radio station, a radio terminal, and a synchronization timer control method in a radio communication system, which reduce a delay in uplink signal resynchronization as much as possible in a case where a plurality of cell groups exist.

Solution to Problem

A radio terminal according to the present invention is a radio terminal having a function of communicating with a radio station by using a plurality of radio resources that correspond respectively to a plurality of cells, characterized by comprising: a plurality of synchronization timers for determining whether or not uplink signals in individual cell groups are in synchronization, wherein the synchronization timers are provided respectively for the plurality of cell groups each including at least one cell; and control means that controls uplink-signal transmission on the cells included in a second cell group depending on a state of a first synchronization timer provided correspondingly for a first cell group including a specific cell and on a state of a second synchronization timer provided correspondingly for the second cell group other than the first cell group, and controls the first synchronization timer and the second synchronization timer independently.

A method for synchronization timer control at a radio terminal according to the present invention is a method for synchronization timer control at a radio terminal that has a function of communicating with a radio station by using a plurality of radio resources corresponding respectively to a plurality of cells and includes a plurality of synchronization timers for determining whether or not uplink signals in individual cell groups are in synchronization, wherein the synchronization timers are provided respectively for the plurality of cell groups each including at least one cell, characterized by comprising: controlling uplink-signal transmission on the cells included in a second cell group depending on a state of a first synchronization timer provided correspondingly for a first cell group including a specific cell and on a state of a second synchronization timer provided correspondingly for the second cell group other than the first cell group; and controlling the first synchronization timer and the second synchronization timer independently.

A radio station according to the present invention is a radio station having a function of communicating with a radio terminal by using a plurality of radio resources that correspond respectively to a plurality of cells, characterized by comprising: a plurality of synchronization timers for determining whether or not uplink signals in individual cell groups are in synchronization, wherein the synchronization timers are provided respectively for the plurality of cell groups each including at least one cell; and control means that controls scheduling of uplink-signal transmission of the radio terminal on the cells included in a second cell group, depending on a state of a first synchronization timer provided correspondingly for a first cell group including a specific cell and on a state of a second synchronization timer provided correspondingly for the second cell group other than the first cell group, and controls the first synchronization timer and the second synchronization timer independently.

A method for synchronization timer control at a radio station according to the present invention is a method for synchronization timer control at a radio station that has a function of communicating with a radio terminal by using a plurality of radio resources corresponding respectively to a plurality of cells and includes a plurality of synchronization timers for determining whether or not uplink signals in individual cell groups are in synchronization, wherein the synchronization timers are provided respectively for the plurality of cell groups each including at least one cell, characterized by comprising: controlling scheduling of uplink-signal transmission on the cells included in a second cell group, depending on a state of a first synchronization timer provided correspondingly for a first cell group including a specific cell and on a state of a second synchronization timer provided correspondingly for the second cell group other than the first cell group; and controlling the first synchronization timer and the second synchronization timer independently.

A radio communication system according to the present invention is a radio communication system having a function of using a plurality of radio resources corresponding respectively to a plurality of cells, for communication between a radio station and a radio terminal, characterized in that the radio terminal is provided with a plurality of synchronization timers for determining whether or not uplink signals in individual cell groups are in synchronization, wherein the synchronization timers are provided respectively for the plurality of cell groups each including at least one cell, and at the radio terminal, uplink-signal transmission on the cells included in a second cell group is controlled depending on a state of a first synchronization timer provided correspondingly for a first cell group including a specific cell and on a state of a second synchronization timer provided correspondingly for the second cell group other than the first cell group, wherein the first synchronization timer and the second synchronization timer are controlled independently.

Advantageous Effects of Invention

According to the present invention, uplink-signal transmission in a second cell group is controlled depending on the state of a first synchronization timer and the state of a second synchronization timer, and the first and second synchronization timers are controlled independently of each other, whereby it is possible to allow the second synchronization timer to continue running when the first synchronization timer expires, and it is possible to reduce a delay until the completion of resynchronization in the second cell group in a case where resynchronization in the first cell group is performed. Thus, it is possible to suppress a decrease in the throughput of a radio terminal due to such a delay.

BRIEF DESCRIPTION OF DRAWINGS

FIG. 3 is a sequence diagram showing operations of a radio terminal and a radio base station in synchronization timer control shown in FIG. 2.

DESCRIPTION OF EMBODIMENTS

According to the present invention, a plurality of synchronization timers for determining whether or not uplink signals of a radio terminal are in synchronization are maintained correspondingly to a plurality of respective cell groups each including at least one cell. Uplink-signal transmission on a cell included in the second cell group is controlled depending on the state of a first synchronization timer corresponding to a first cell group, which includes a specific cell among the plurality of cell group, and on the state of a second synchronization timer corresponding to a second cell group other than the first cell group, and the first and second synchronization timers are controlled independently of each other. Here, it can be thought that a cell group consists of cells on which the same uplink-signal transmission timing can be used.

According to such control, when the first synchronization timer for the first cell group including the specific cell expires, it is possible to allow the second synchronization timer for the second cell group, which is another cell group, to independently continue running. Accordingly, by stopping at least uplink-data transmission on the cells of the second cell group while having the second synchronization timer for the second cell group continue running, uplink-signal transmission on the cells of the second cell group can be immediately performed without delay when resynchronization is established on a cell (for example, the specific cell) included in the first cell group and the first synchronization timer for the first cell group is started. Hereinafter, an exemplary embodiment and some examples of the present invention will be described in detail.

1. Exemplary Embodiment 1.1) System Architecture

In an exemplary embodiment of the present invention, a radio communication system including a radio station and a radio terminal is assumed, and for the radio station, a radio base station, a base station controller, or the like can be assumed. In the present exemplary embodiment and examples, which will be described later, a description will be given assuming that the radio station is a radio base station as an example.

Figure 1:
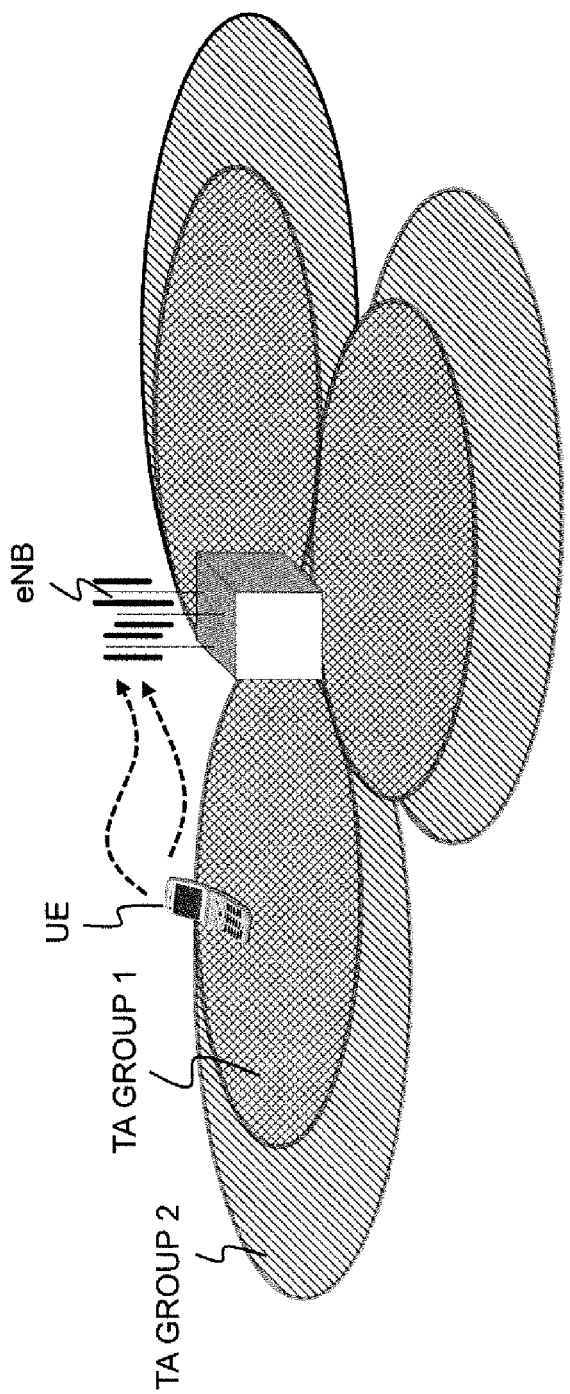
FIG. 1 is a schematic diagram of a system for describing synchronization groups in LTE-Advanced.
Figure 2A:
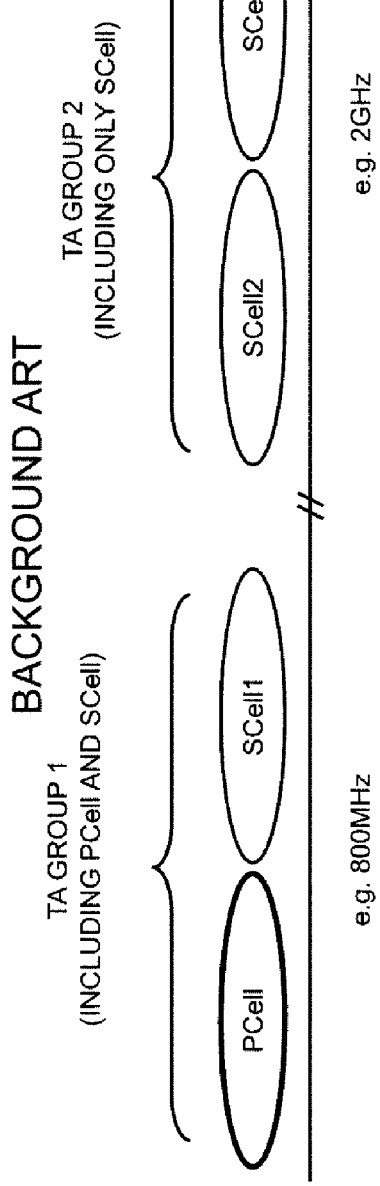
FIG. 2A is a schematic diagram for describing carrier aggregation in the system shown in FIG. 1.
Figure 2B:
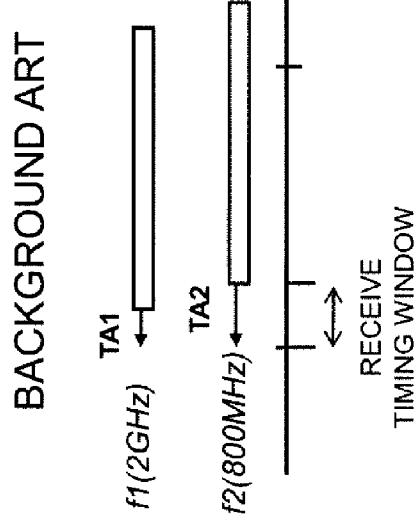
FIG. 2B is a schematic diagram for describing uplink-signal transmission timing adjustment values for the synchronization groups shown in FIG. 2A.
Figure 4:
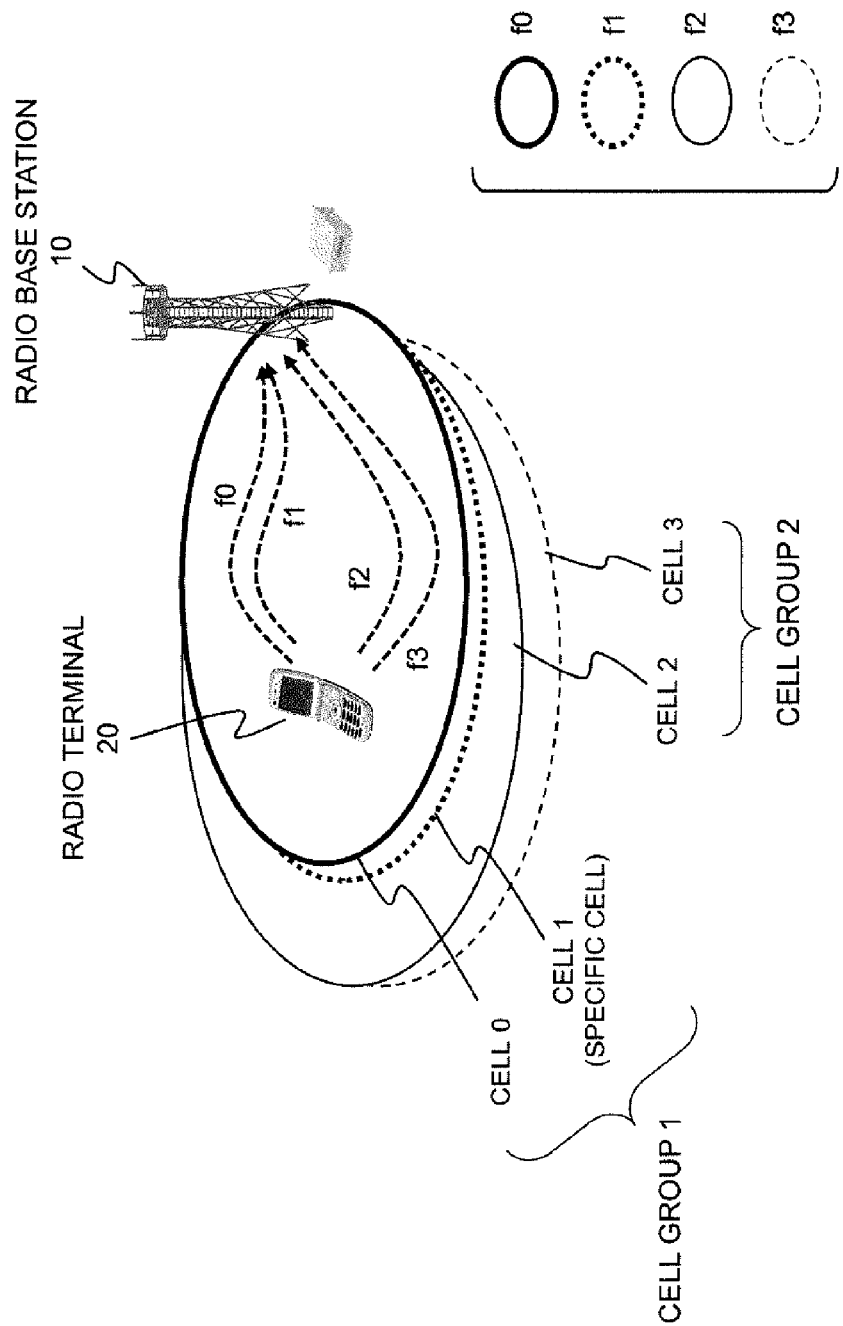
FIG. 4 is a schematic diagram showing an example of cell groups for describing carrier aggregation in a radio communication system according to an exemplary embodiment of the present invention.

FIG. 4 shows only one sector in order to avoid complicating the drawing, but an ordinary configuration includes a plurality of sectors. A radio base station 10 manages cells 0 to 3 using four frequency bands f0, f1, f2, and f3, and a radio terminal 20 can transmit uplink signals by using a plurality of frequency bands at the same time. That is, the radio terminal 20 can transmit uplink signals by using, at the same time, all or some of an uplink radio resource on the cell 0 of the frequency band f0 (hereinafter, simply referred to as cell 0), an uplink radio resource on the cell 1 of f1 (hereinafter, simply referred to as cell 1), an uplink radio resource on the cell 2 of f2 (hereinafter, simply referred to as cell 2), and an uplink radio resource on the cell 3 of f3 (hereinafter, simply referred to as cell 3), wherein the radio resources meet a predetermined condition. The predetermined condition here is that, for example, in accordance with uplink radio resource configuration information received from the radio base station 10, this radio resource is (explicitly or inexplicitly) activated and is in an available state.

Moreover, these plurality of cells 0 to 3 (that is, the respective uplink radio resources) are grouped in accordance with a predetermined rule, and here it is assumed that the cells 0 and 1 are grouped into a cell group 1 and the cells 2 and 3 are grouped into a cell group 2. The predetermined rule here is that, for example, propagation delays (propagation characteristics) are identical (similar) and so the same uplink-signal transmission timing adjustment value can be applied (used) (transmission timing configuration can be shared). Uplink-signal transmission timing control of the radio terminal 20 is performed in units of such a cell group.

Further, the radio base station 10 and the radio terminal 20 have synchronization timers used to determine whether or not uplink signals are in synchronization, which are provided for cell groups respectively and are controlled (started, restarted, or stopped) independently of each cell group. Specifically, of the synchronization timers provided to the radio base station 10/radio terminal 20, a synchronization timer 1 is started or restarted each time a "transmission timing adjustment value" for adjusting uplink-signal transmission timing on the cells of the cell group 1 is transmitted/received, while a synchronization timer 2 is started or restarted each time a transmission timing adjustment value for the cells of the cell group 2 is transmitted/received. Note that a "cell group" here does not necessarily include a plurality of cells as shown in FIG. 4, but some cell group may include only one cell.

Figure 5:
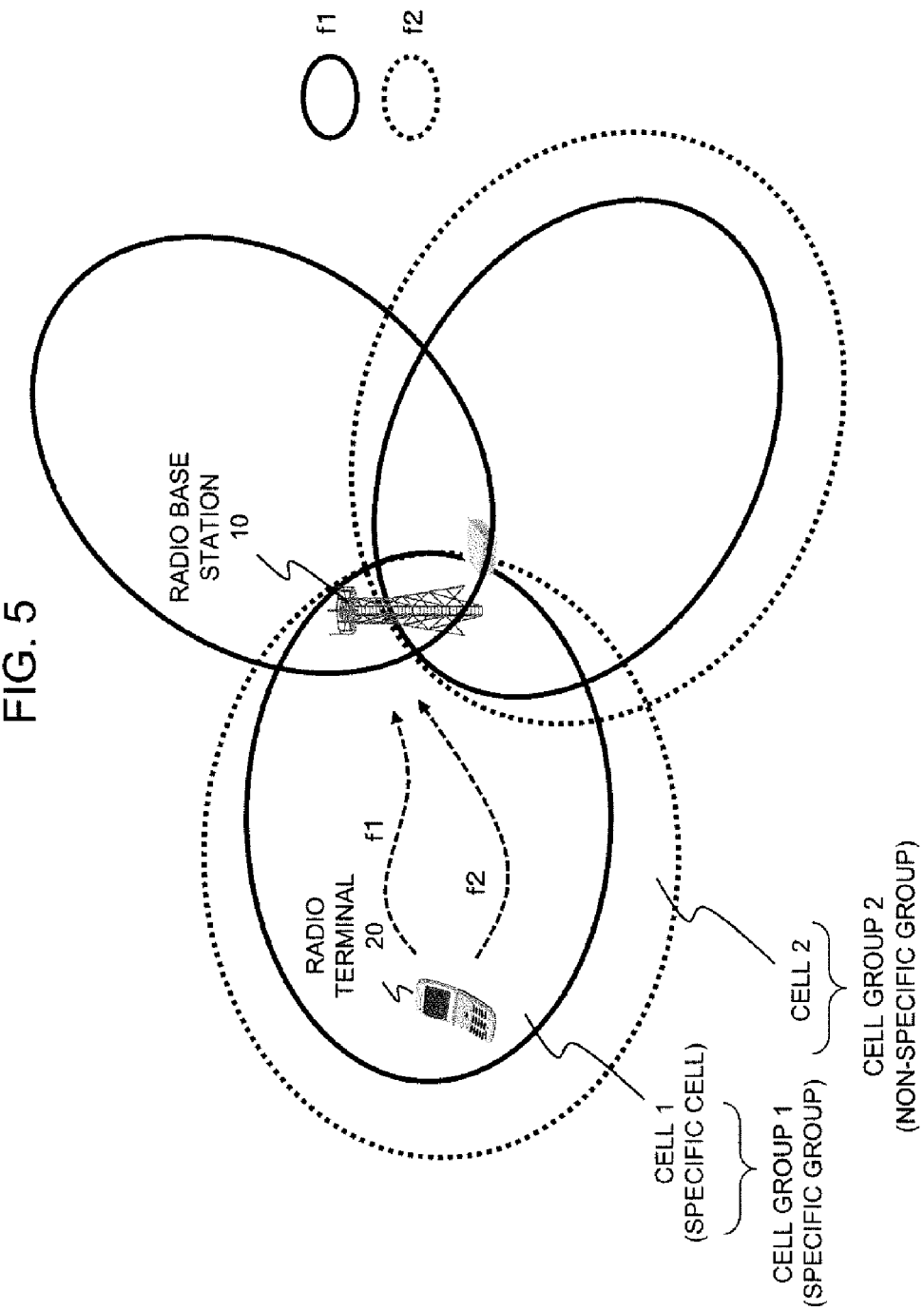
FIG. 5 is a schematic diagram showing another example of cell groups for describing carrier aggregation in the radio communication system according to the present exemplary embodiment.

Hereinafter, synchronization timer control according to the present exemplary embodiment will be described by taking, as an example, a system in which a cell group 1 (specific group) includes only a specific cell 1 and a cell group 2 (non-specific group) includes only a non-specific cell 2 as shown in FIG. 5, for simplicity. The specific cell 1 has roles different from the non-specific cell 2. For example, the specific cell 1 is used to perform processing for establishing an initial radio connection required for the radio terminal 20 to communicate with the radio base station 10, as well as to obtain basic information such as security information and to transmit control signals. However, it is obvious from a description below that the present invention can similarly be applied to a system in which a cell group includes a plurality of cells. Moreover, although shown in FIG. 5 is a 3-sector configuration (three sector cells per radio base station), the present invention is not limited to this but can similarly be applied to configurations other than the 3-sector one such as, for example, 1-sector and 6-sector ones. Further, conceivable cases where uplink-signal transmission timings on the cells 1 and 2 need to be independently controlled are cases where f1 and f2 are greatly different (for example, 800 MHz and 2 GHz), where a reproduction station (a repeater) exists for each or one of f1 and f2, and the like.

1.2) Synchronization Timer Control

Figure 6:
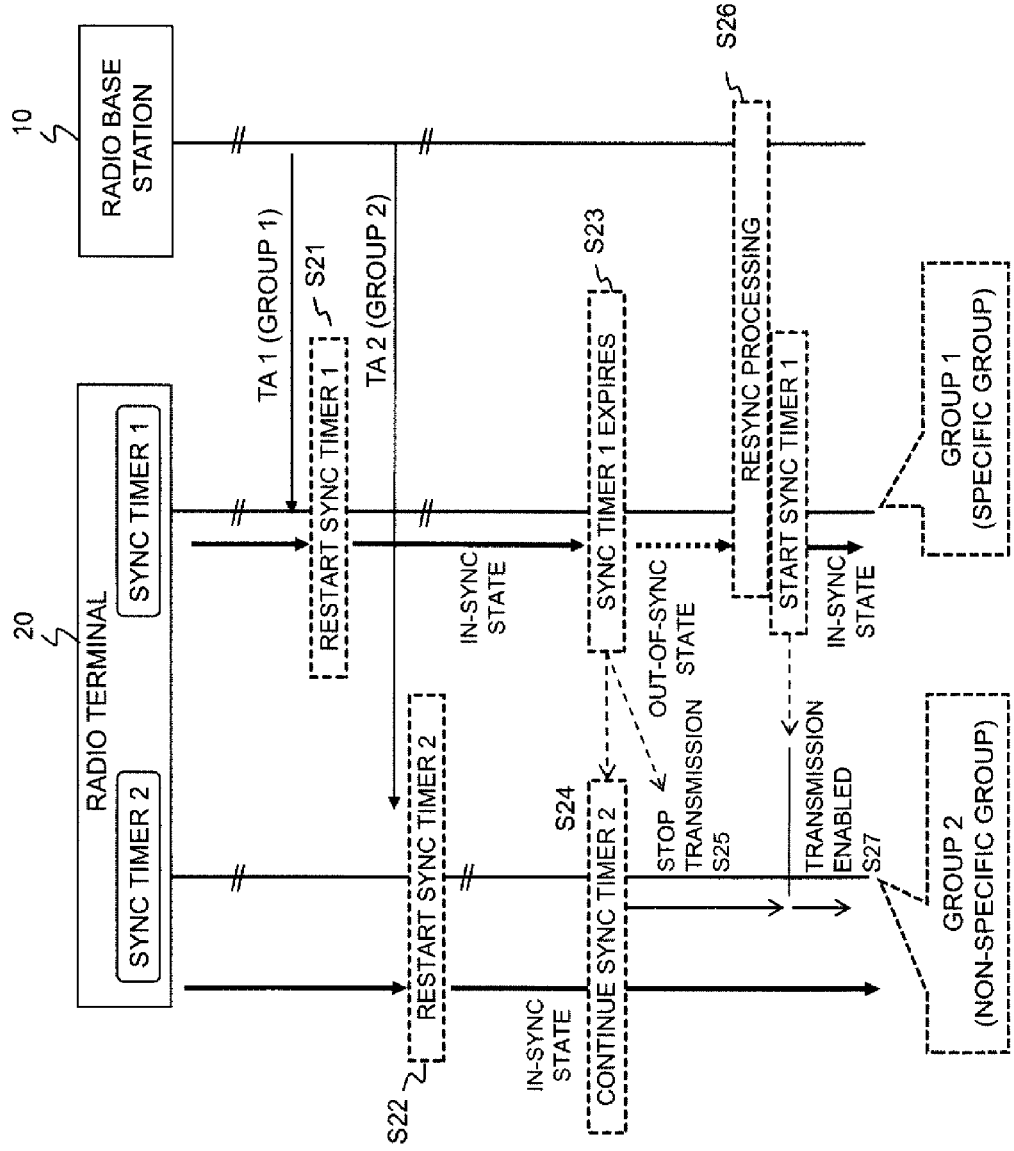
FIG. 6 is a sequence diagram showing operations of a radio terminal and a radio base station in the radio communication system according to the present exemplary embodiment.

Referring to FIG. 6, the synchronization timers 1 and 2 are provided to the radio terminal 20 correspondingly for the cell group 1 (specific group) and the cell group 2 (non-specific group), respectively, and are controlled independently for each cell group. Note that it is conceivable that synchronization timers (not shown) corresponding to the synchronization timers 1 and 2 are similarly provided to the radio base station 20. That is, the synchronization timers 1 and 2 are started when uplink-signal synchronization is established on the cells of their respective cell groups; while they are running, the radio base station 10 transmits transmission timing adjustment values TA1 and TA2; when the radio terminal 20 receives them, the corresponding synchronization timers1 and 2 are restarted (Steps S21 and S22). According to such timer control, depending on whether or not the synchronization timers 1 and 2 are running, the radio terminal UE can determine whether or not uplink-signal synchronization is guaranteed in the respective cell groups.

According to the present exemplary embodiment, the state of the synchronization timer 1 for the cell group 1 (specific group) is associated not only with uplink-signal (for example, uplink-data) transmission on the cell 1 included in the cell group 1 but also with uplink-signal transmission on the cell 2 included in the cell group 2 (non-specific group) other than the cell group 1. "Associate" here means that the state of a synchronization timer for a certain cell group is also linked with enabling/disabling uplink-signal transmission on the cells of another cell group, not only of this certain cell group. For example, when the synchronization timer 1 for the cell group 1 expires, not only transmission of uplink signals (except access signals that can be transmitted when synchronization is lost) on the cell 1 included in this cell group 1 is stopped, but transmission of some or all uplink signals on the cell 2 included in the cell group 2 is also stopped. Here, a conceivable case where transmission of some uplink signals is stopped (is not performed) is, but is not limited to, a case where transmission of data is stopped but transmission of control signals and/or known signals (pilot signals and reference signals) is not stopped, that is, continues to be performed. "Associate" illustrated in FIG. 6 is as follows.

Referring to FIG. 6, when the synchronization timer 1 for the cell group 1 (specific group) expires (Step S23), uplink transmission on the cell 1 included in the cell group 1 falls in an out-of-synchronization state (is regarded to be in an out-of-synchronization state) and is stopped. If the synchronization timer 2 for the cell group 2 (non-specific group) is running at this time, this synchronization timer 2 is not stopped but is left continuously running (Step S24), while at least uplink data transmission on the cell 2 included in the non-specific group 2 is stopped (Step S25). However, an uplink access signal for synchronization/resynchronization (for example, a random access preamble) can be transmitted as necessary. The radio base station 10, when the synchronization timer 1 expires, stops uplink-signal scheduling on the cell 1 included in the cell group 1.

The radio base station 10 and the radio terminal 20 perform processing for resynchronization on the cell 1 included in the cell group 1 if an uplink signal needs to be transmitted again in the cell groups 1 and 2 (Step S26). When resynchronization is established, the synchronization timer 1 for the cell group 1 is started, allowing uplink transmission on the cell 1 included in the cell group 1 to be in an in-synchronization state. If the synchronization timer 2 for the cell group 2 is running (is not expired) at this time, uplink transmission is restarted on the cell 2 included in the cell group 2, enabling uplink transmission including uplink data transmission (Step S27). Here, enabling uplink-signal transmission means that when a radio resource for uplink-signal transmission is scheduled (assigned), transmission can be performed in accordance with such scheduling. Note that if radio resources for periodic transmission of an uplink signal have already been scheduled (assigned), the meaning is that transmission can be performed by using such scheduled radio resources.

1.3) Effects

As described above, according to the present exemplary embodiment, even when the synchronization timer 1 for the cell group 1 (specific group) expires, the synchronization timer 2 for the cell group 2 (non-specific group), if it is running, is left continuously running, while at least uplink data transmission on the cell of the cell group 2 is stopped. Then, when resynchronization in the cell group 1 is established and the synchronization timer 1 for the cell group 1 is started, uplink transmission on the cell of the cell group 2 can immediately be performed if the synchronization timer 2 for the cell group 2 is still running.

In this manner, enabling/disabling uplink-signal transmission in the cell group 2 is linked with the state of the synchronization timer 1 for the cell group 1, whereby as long as the synchronization timer 2 is running, uplink-signal transmission on the cell of the cell group 2 can be restarted immediately (for example, when uplink scheduling information is received, without awaiting resynchronization), and so it is possible to reduce a delay occurring when resynchronization is performed, and to suppress a decrease in the throughput of the radio terminal.

2. Functional Configurations of Radio Station and Radio Terminal

Figure 7:
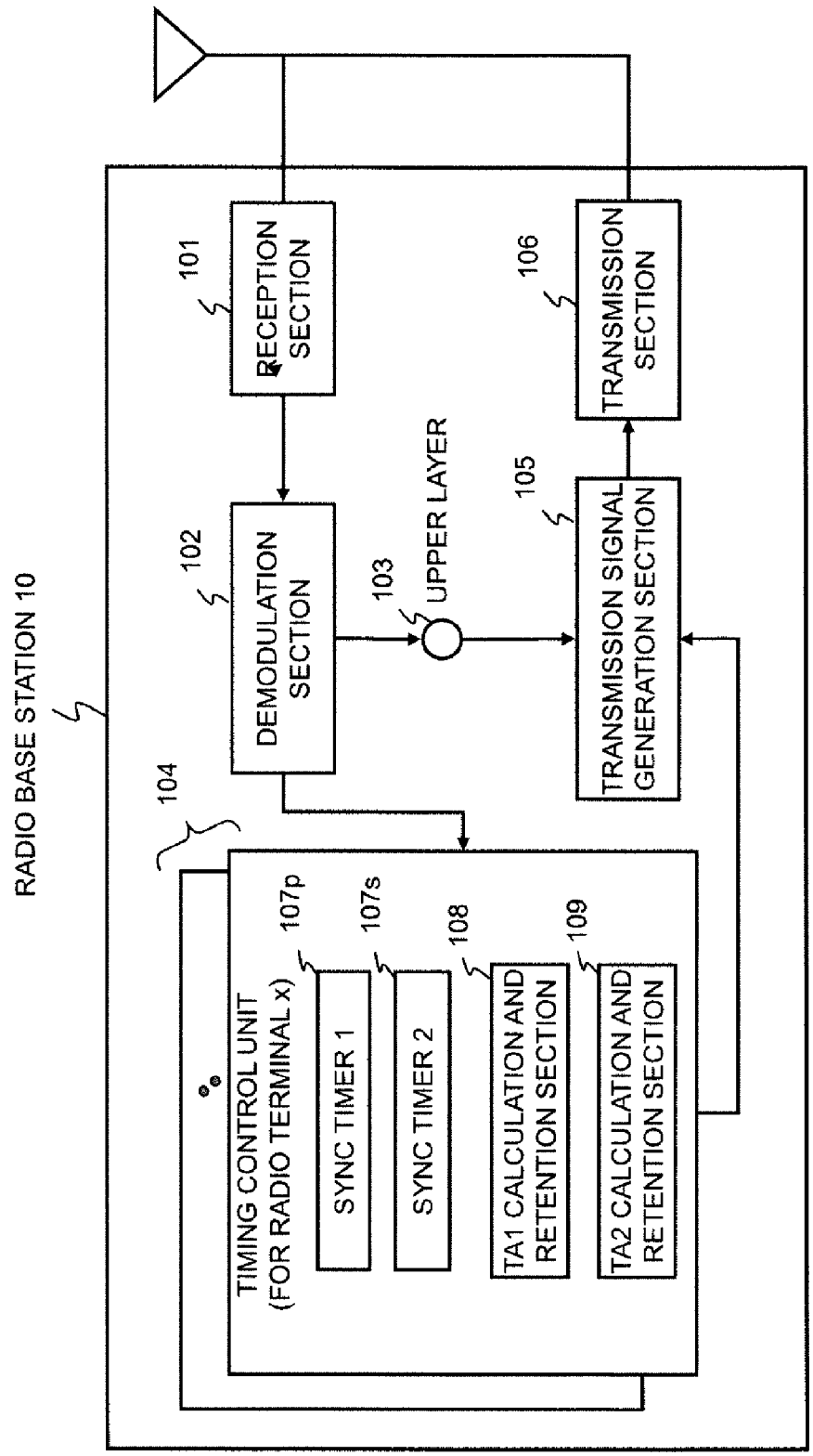
FIG. 7 is a block diagram showing a functional configuration of the radio base station according to the present exemplary embodiment.

Referring to FIG. 7, the radio base station 10 as a radio station have a reception section 101 that receives signals from a plurality of radio terminals individually and a demodulation section 102 that demodulates the received signals, and received user data is processed at an upper layer 103. A timing control unit 104 is provided correspondingly for each of the plurality of radio terminals and transmits the above-described respective uplink-signal transmission timing adjustment values for cell groups that are used by each radio terminal, thus controlling the transmission timings of uplink signals to be transmitted by the corresponding radio terminal. A transmission signal generation section (Tx signal generator) 105 generates downlink signals to the radio terminals, and a transmission section 106 transmits the downlink signals.

The timing control unit 104 includes, as functional components, the synchronization timer 1 (at reference sign 107$p$ in FIG. 7) used to determine whether or not uplink signals in the cell group 1 (specific group) at a radio terminal x are in synchronization, the synchronization timer 2 (at reference sign 107$s$ in FIG. 7) used to determine whether or not uplink signals in the cell group 2 (non-specific group) at the radio terminal x are in synchronization, a TA1 calculation and retention section 108 that calculates and retains a transmission timing adjustment value TA1 for the cell of the cell group 1, and a TA2 calculation and retention section 109 that calculates and retains a transmission timing adjustment value TA2 for the cell of the cell group 2.

Note that here illustrated is a case of two synchronization groups as shown in FIG. 5, that is, the cell group 1 (specific group) and the cell group 2 (non-specific group), but if there are three or more cell groups (one specific group and two or more non-specific groups), a synchronization timer and an uplink-signal transmission timing adjustment value calculation and retention section are provided for each of them.

Figure 8:
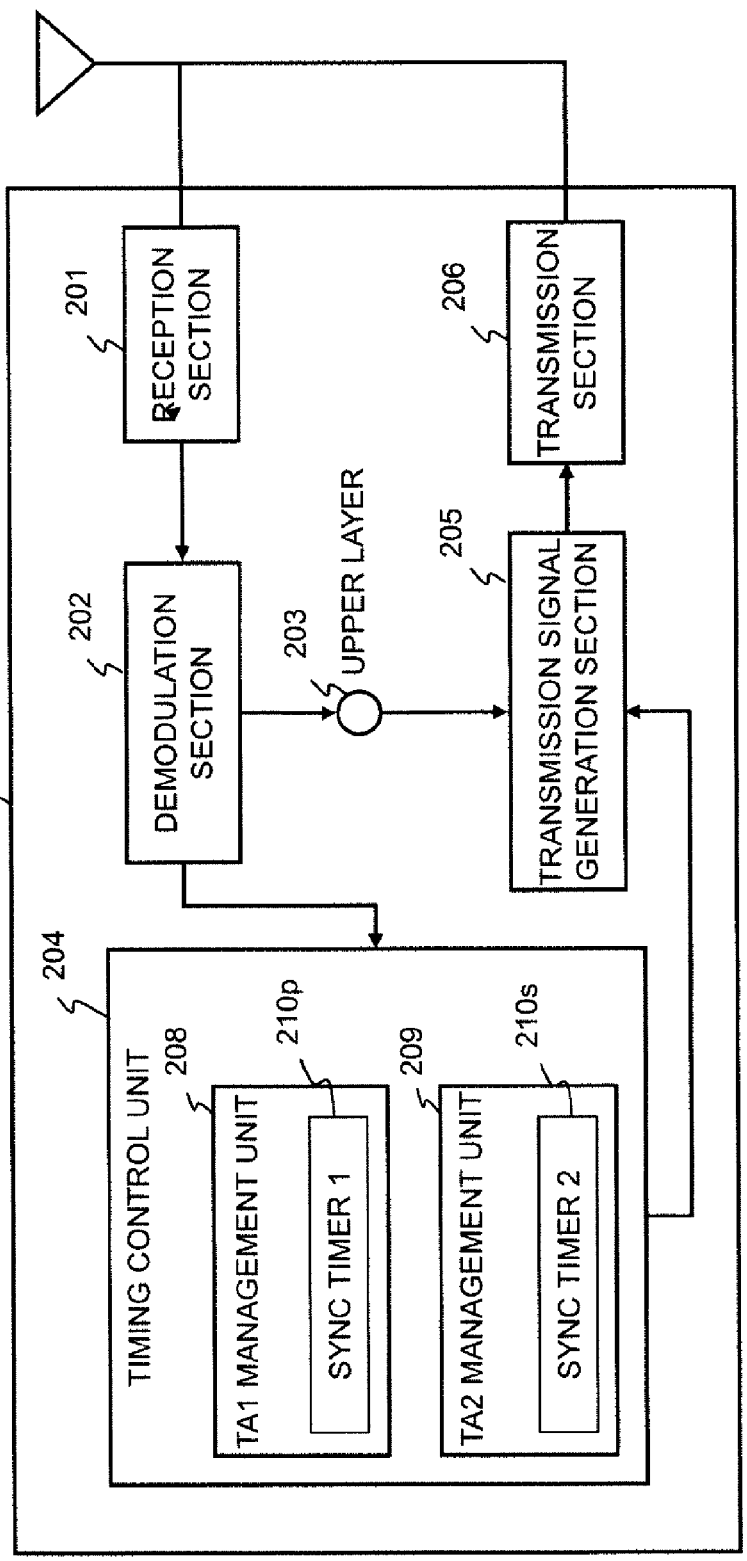
FIG. 8 is a block diagram showing a functional configuration of the radio terminal according to the present exemplary embodiment.

Referring to FIG. 8, the radio terminal 20 includes a reception section 201 that receives signals from the radio base station 10, a demodulation section 202 that demodulates the received downlink signals, an upper layer 203 that processes downlink data, a timing control unit 204 that performs control of uplink-signal transmission timing in each cell group in accordance with an uplink-signal transmission timing adjustment value from the radio base station 10, a transmission signal generation section 205 that generates uplink signals to the radio base station 10, and a transmission section 206 that transmits the uplink signals.

The timing control unit 204 includes, as functional components, a TA1 management unit 208 that controls transmission timing on the cell of the cell group 1 in according with an uplink-signal transmission timing adjustment value TA1 from the radio base station 10 and a TA2 management unit 209 that controls transmission timing on the cell of the cell group 2 in according with an uplink-signal transmission timing adjustment value TA2 from the radio base station 10. Further, the TA1 management unit 208 includes the synchronization timer 1 (at reference sign 210$p$ in FIG. 8) used to determine whether or not uplink-signal transmission timing in the cell group 1 is in synchronization, and the TA2 management unit 209 includes the synchronization timer 2 (at reference sign 210$s$ in FIG. 8) used to determine whether or not uplink-signal transmission timing in the cell group 2 is in synchronization.

Note that the functions of the timing control unit 104 in the radio base station 10 shown in FIG. 7 can also be implemented by executing programs stored in a memory (not shown) on a program-controlled processor such as a CPU.

Similarly, the functions of the timing control unit 204 in the radio terminal 20 shown in FIG. 8 can also be implemented by executing programs stored in a memory (not shown) on a program-controlled processor such as a CPU.

Hereinafter, basic operations for synchronization timer control of the radio base station 10 and the radio terminal 20 shown in FIGS. 7 and 8 will be described in detail with reference to FIGS. 9 and 10.

3. First Example 3.1) Synchronization Timer Control

Figure 9:
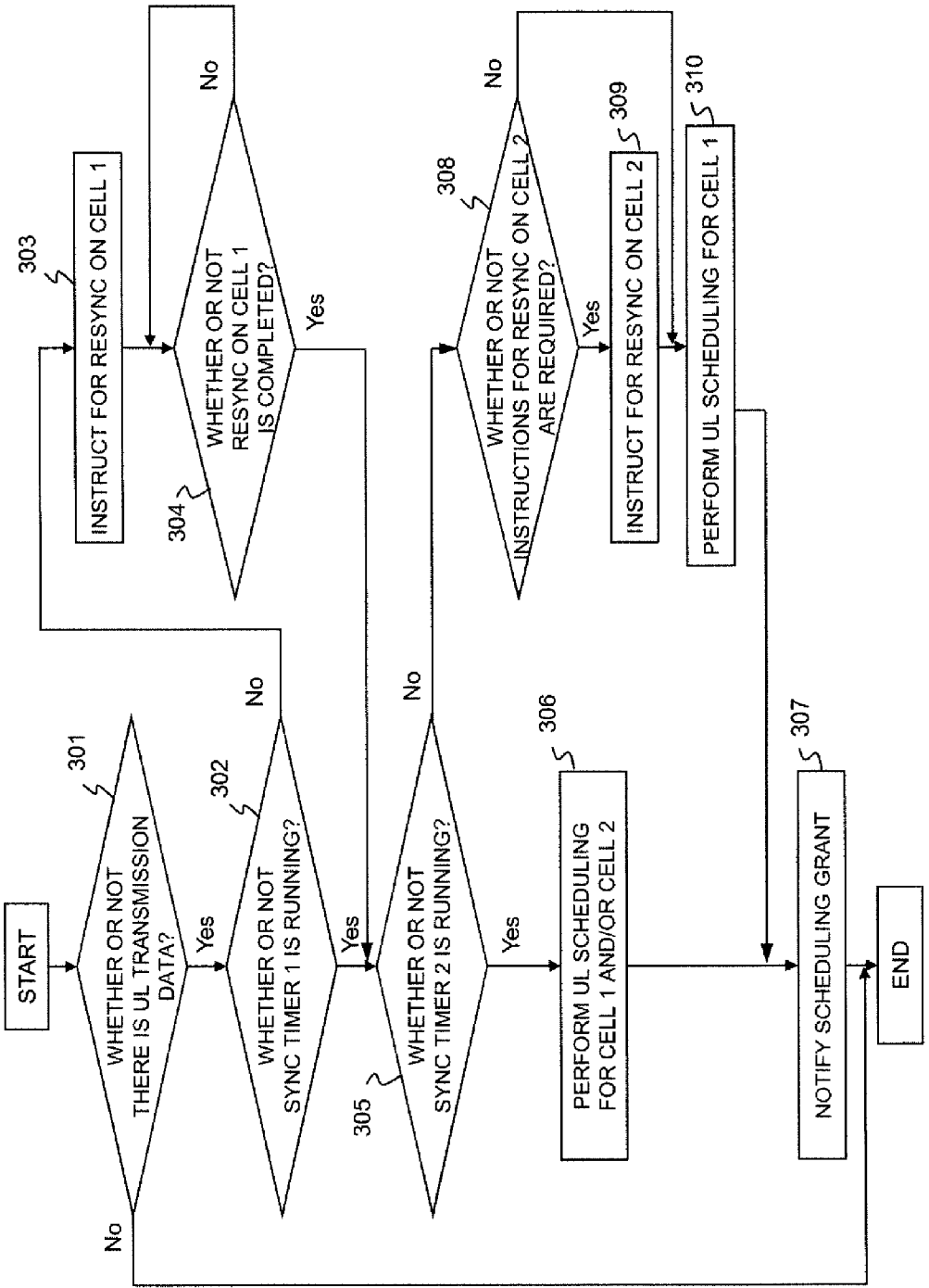
FIG. 9 is a flowchart showing a method for synchronization timer control at the radio base station according to a first example of the present invention.
Figure 10:
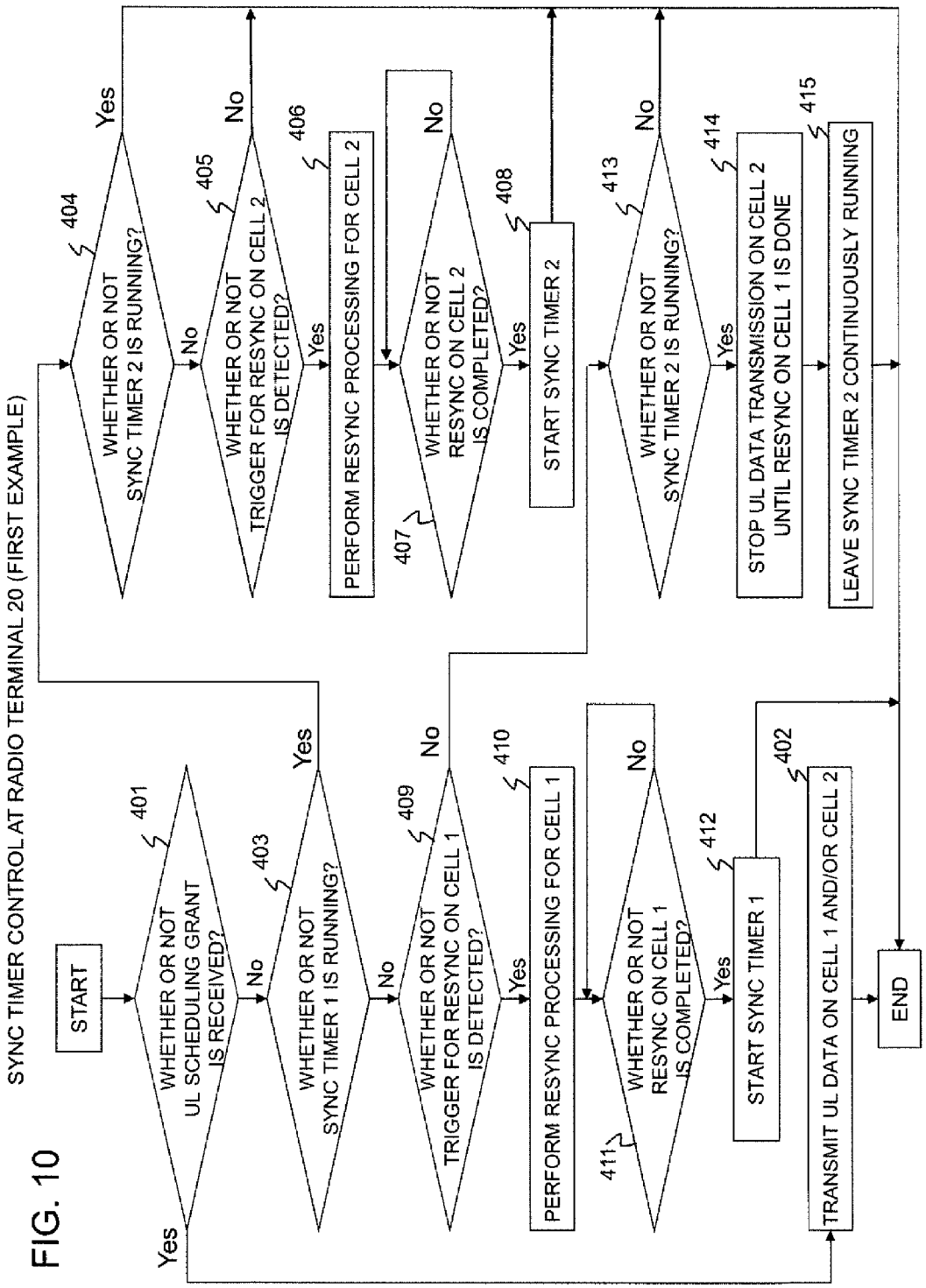
FIG. 10 is a flowchart showing a method for synchronization timer control at the radio terminal according to the first example of the present invention.

FIGS. 9 and 10 show basic operations of the radio base station 10 and the radio terminal 20 according to a present example, respectively. Here, at a stage preliminary to data transmission, the radio terminal 20 makes a scheduling request (Scheduling Request: SR) to request an uplink radio resource and a transmission buffer status report (Buffer Status Report: BSR) as necessary. However, steps concerning such a scheduling request are omitted in FIGS. 9 and 10.

Referring to FIG. 9, the timing control unit 104 of the radio base station 10 first determines whether or not there is uplink transmission data that a target radio terminal x requests to transmit (Step 301) and, when there is uplink transmission data (Step 301: Yes), determines whether or not the synchronization timer 1 ($107p$) for the cell group 1 is running (Step 302).

When the synchronization timer 1 ($107p$) is not running (expires) (Step 302; No), the timing control unit 104 gives instructions for uplink resynchronization on the cell 1 (Step 303). When resynchronization is completed on the cell 1 (Step 304; Yes), it is determined whether or not the synchronization timer 2 ($107s$) for the cell group 2 is running (Step 305).

When the synchronization timer 2 ($107s$) is running (Step 305; Yes), the timing control unit 104 performs uplink scheduling on the cell 1 and/or cell 2 for the radio terminal x (Step 306) and notifies a scheduling grant (a result of scheduling) (Step 307).

When the synchronization timer 2 ($107s$) is not running (expires) (Step 305; No), the timing control unit 104 determines whether or not resynchronization on the cell 2 is required (Step 308) and, when it is required (Step 308; Yes), gives instructions for uplink resynchronization on the cell 2 (Step 309). Step 309 is not performed if resynchronization on the cell 2 is not required (Step 308; No). Then, the timing control unit 104 performs uplink scheduling on the cell 1 for the radio terminal x (Step 310) and notifies a scheduling grant (Step 307). Note that the radio base station 10 can also perform uplink scheduling on the cell 2 when uplink resynchronization on the cell 2 is confirmed.

Referring to FIG. 10, the timing control unit 204 of the radio terminal 20, after making a scheduling request and a transmission buffer status report (not shown), determines whether or not an uplink scheduling grant is received (Step 401) and, when it is received (Step 401; Yes), transmits uplink data on the cell 1 and/or cell 2 in accordance with this scheduling grant (Step 402).

When no uplink scheduling grant is received (Step 401; No), the timing control unit 204 determines whether or not the synchronization timer 1 ($210p$) for the cell group 1 is running (Step 403) and, when it is running (Step 403; Yes), similarly performs determination as to the synchronization timer 2 ($210s$) for the cell group 2 (Step 404). When the synchronization timer 2 ($210s$) is not running (Step 404; No), it is determined whether or not a trigger for uplink resynchronization on the cell 2 is issued (Step 405). Here, conceivable triggers for resynchronization include, for example, instructions for resynchronization from the radio base station 10, a result of determination made by the radio terminal itself, concluding that the amount of data in an uplink transmission buffer reaches or exceeds a predetermined value and transmission using a plurality of cells is preferable, or alternatively the fact that uplink synchronization is maintained on another cell (in another cell group) to be simultaneously used, and the like.

When a trigger for uplink resynchronization on the cell 2 is issued (Step 405; Yes), processing required for uplink resynchronization on the cell 2 is performed (Step 406). For example, conceivable processing for resynchronization is processing in which an access signal for random access or the like is transmitted and an uplink-signal transmission timing adjustment value is obtained, or the like. When resynchronization on the cell 2 is completed (Step 407; Yes), the synchronization timer 2 ($210s$) is started (Step 408), and the series of steps is finished. When the synchronization timer 2 ($210s$) is running (Step 404; Yes), or when no trigger for uplink resynchronization on the cell 2 is issued (Step 405; No), the series of steps is immediately finished.

Moreover, when the synchronization timer 1 ($210p$) is not running (Step 403; No), it is determined whether or not a trigger for uplink resynchronization on the cell 1 is issued (Step 409). When a trigger is issued (Step 409; Yes), processing required for uplink resynchronization on the cell 1 is performed (Step 410), and when resynchronization is completed (Step 311; Yes), the synchronization timer 1 ($210p$) is started (Step 412), and the series of steps is finished.

Further, when no trigger for uplink resynchronization on the cell 1 is issued (Step 409; No), it is determined whether or not the synchronization timer 2 ($210s$) for the cell group 2 is running (Step 413). When it is running (Step 413; Yes), uplink data transmission on the cell 2 is stopped (is not performed) until resynchronization on the cell 1 is completed (Step 414). At this time, the synchronization timer 2 ($210s$) is left continuously running (Step 415), and the series of steps is finished. Note that in this case, although uplink data transmission is stopped on the cell 2, known signals such as control signals and reference signals may be transmitted. If the synchronization timer 2 ($210s$) is not running (Step 413; No), the series of steps is immediately finished.

Note that in a case where a cell group includes a plurality of cells as shown in FIG. 4, the radio base station 10 calculates an uplink-signal transmission timing adjustment value for each cell group and notifies it to the radio terminal 20. In this event, an uplink signal on any of cells may be used to calculate an uplink-signal transmission timing adjustment value as long as the cells are of a cell group. When the radio terminal 20 receives a transmission timing adjustment value, the radio terminal 20, for each cell group, applies the received transmission timing adjustment value to all the cells included in the cell group. According to such control, in a case where the radio terminal 20 uses uplink radio resources on respective cells of a plurality of cell groups in each of which uplink-signal transmission timing control needs to be performed independently, it is possible to appropriately perform uplink-signal synchronization management by using synchronization timers that operate independently for the respective cell groups.

3.2) Effects

According to the above-described synchronization timer control, even when the synchronization timer 1 ($210p$) for the cell group 1 (specific group) expires, the synchronization timer 2 ($210s$) for the cell group 2 (non-specific group) is left continuously running if it is running, while at least uplink data transmission on the cell of the cell group 2 is stopped. Then, when resynchronization in the cell group 1 is established and the synchronization timer 1 (210p) for the cell group 1 is started, uplink transmission on the cell of the cell group 2 can be performed without performing resynchronization processing if the synchronization timer 2 (210s) for the cell group 2 is still running.

4. Second Example

Figure 11:
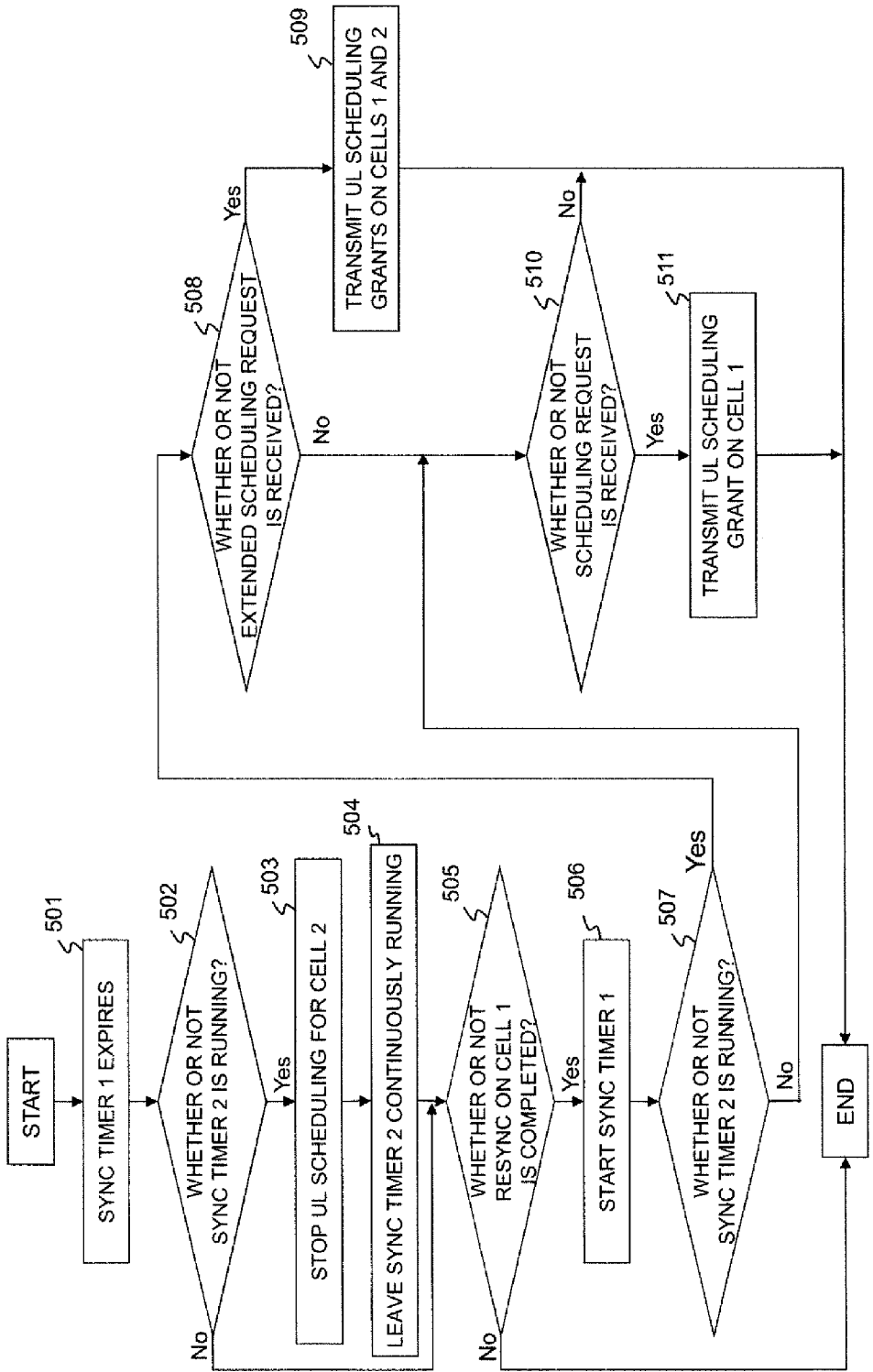
FIG. 11 is a flowchart showing a method for synchronization timer control at the radio base station according to a second example of the present invention.

In synchronization timer control according to a second example of the present invention shown in FIG. 11, attention is given to processing concerning a scheduling request, data transmission, and the like performed by the radio terminal 20 after the synchronization timer 1 for the cell group 1 expires.

4.1) Synchronization Timer Control

Referring to FIG. 11, at the radio base station 10, when the synchronization timer 1 for the cell group 1 expires (Step 501), it is determined whether or not the synchronization timer 2 for the cell group 2 is running (Step 502). When the synchronization timer 2 is running (Step 502; Yes), uplink scheduling on the cell 2 (even though it is required) is stopped (Step 503), while the synchronization timer 2 is left continuously running (Step 504). If the synchronization timer 2 is not running (Step 502; No), steps 503 and 504 are not performed.

Subsequently, it is determined whether or not uplink resynchronization is done on the cell 1 (Step 505), and when resynchronization is done (Step 505; Yes), the synchronization timer 1 is started (Step 506). Here, a conceivable reason for establishing uplink resynchronization on the cell 1 is to cause the radio terminal 20 to transmit uplink data, to cause the radio terminal 20 to transmit a response (control signal) to downlink data transmission made to the radio terminal 20, or the like.

Subsequently, it is determined whether or not the synchronization timer 2 is running (Step 507), and if it is still running (Step 507; Yes), it is determined whether or not an uplink extended scheduling request is received (Step 508). Here, the extended scheduling request is a request that is used when uplink signals are transmitted using (uplink radio resources on) a plurality of cells and that can request (for example) more resources than a conventional scheduling request. If an extended scheduling request is received (Step 508; Yes), scheduling grants on the cells 1 and 2 are notified to the radio terminal 20 (Step 509).

Moreover, when the synchronization timer 2 is not running (Step 507; No), or when no extended scheduling request is received (Step 508; No), it is determined whether or not an ordinary scheduling request is received (Step 510). If a conventional scheduling request is received (Step 510; Yes), a scheduling grant on the cell 1 is notified to the radio terminal 20 (Step 511).

Figure 12:
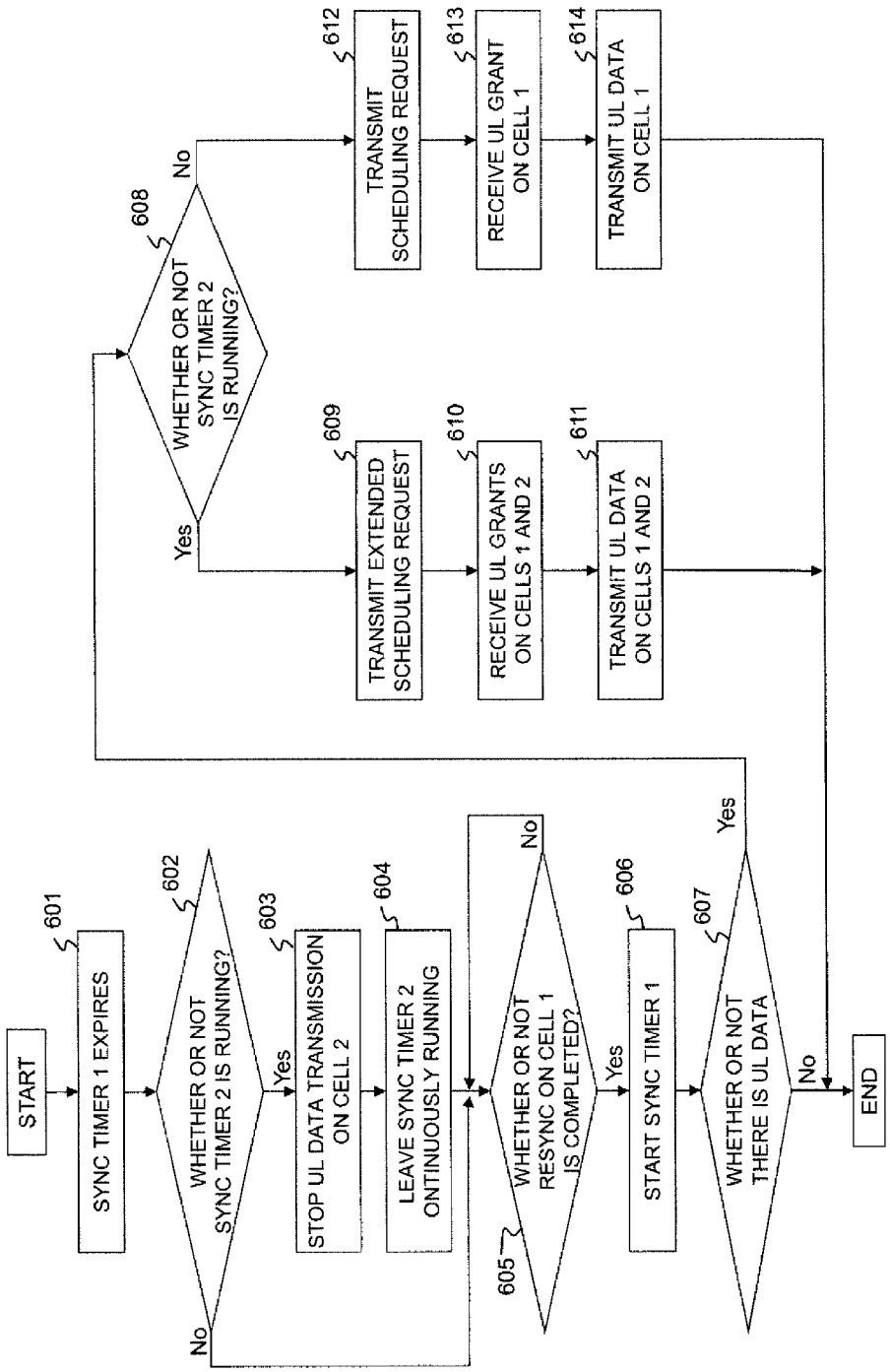
FIG. 12 is a flowchart showing a method for synchronization timer control at the radio terminal according to the second example of the present invention.

Referring to FIG. 12, at the radio terminal 20, when the synchronization timer 1 for the cell group 1 expires (Step 601), it is determined whether or not the synchronization timer 2 for the cell group 2 is running (Step 602). When the synchronization timer 2 is running (Step 602; Yes), uplink data transmission on the cell 2 (even if it is scheduled) is stopped (is not performed) (Step 603), while the synchronization timer 2 is left continuously running (Step 604). Then, processing for resynchronization on the cell 1 is performed as necessary (not shown).

When resynchronization on the cell 1 is done (Step 605; Yes), the synchronization timer 1 is started (Step 606), and it is determined whether or not there is uplink data to transmit (Step 607). When there is uplink data (Step 607; Yes), it is determined whether or not the synchronization timer 2 is still running (Step 608).

When the synchronization timer 2 is running (Step 608; Yes), an extended scheduling request is transmitted (Step 609). When uplink scheduling grants on the cells 1 and 2 are received as a response to the extended scheduling request (Step 610), uplink data is transmitted on each of the cells 1 and 2 in accordance with the grants (Step 611). If the synchronization timer 2 is not running (Step 608; No), an ordinary scheduling request is transmitted (Step 612). When an uplink scheduling grant on the cell 1 is received as a response to the scheduling request (Step 613), uplink data is transmitted on the cell 1 in accordance with the grant (Step 614).

4.2) Effects

According to the above-described synchronization timer control of the present example, when uplink synchronization is reestablished on the cell 1 after the synchronization timer 1 for the cell group 1 including the cell 1 is once expired, uplink data transmission can also be performed on the cell 2 immediately without need to reestablish uplink synchronization in the cell group 2 including the cell 2. That is, it is possible to suppress a delay until uplink data transmission is performed again using (uplink radio resources on) a plurality of cells. Note that even if the radio terminal 20 transmits an extended scheduling request, scheduling grants on both the cells 1 and 2 are not necessarily received, but a scheduling grant may be on any one of them. Moreover, even if the synchronization timer 2 is running, an ordinary scheduling request may be made. It is needless to say that such cases are also incorporated in the scope of application of the present invention. Further, it is also obvious that the present invention can also be applied in cases where there are three or more cell groups in each of which uplink-signal transmission timing control is performed independently.

5. Application Example

As a concrete application example of the present invention, a radio communication system in conformity with 3GPP LTE (Long Term Evolution) will be described in detail. As described already, in LTE, carrier aggregation (CA) is defined in which a radio terminal (User Equipment: UE) transmits and receives user data and upper layer control information by simultaneously using a plurality of component carriers (CC) that correspond to a plurality of cells respectively. The present invention can be applied to such carrier aggregation CA in LTE.

In the functionality of the carrier aggregation CA, a cell used by a radio terminal UE to obtain system information and security information that are most fundamental in communication with a radio base station eNB is referred to as primary cell (PCell), and other cells which are used simultaneously with the primary cell PCell are referred to as secondary cell (SCell). That is, the radio terminal UE can transmit and receive user data and the like by using the single primary cell PCell and one or more secondary cells SCell at the same time.

Note that in preparation for performing downlink carrier aggregation CA, the radio base station eNB first configures secondary cells SCell (configure SCell) for the radio terminal UE. In this event, minimum components required to configure secondary cells are information about component carriers CC corresponding to downlink radio resources. Then, a secondary cell to be actually used is selected among the configured secondary cells (configured SCell), and instructions are made to the radio terminal UE to activate this secondary cell (activation of SCell). Thereafter, the radio terminal UE can receive downlink signals by using the actually activated secondary cell (activated SCell) and the primary cell PCell at the same time.

On the other hand, in preparation for performing uplink carrier aggregation CA, the radio base station eNB notifies, in addition to information about a downlink component carrier CC, information about a component carrier CC corresponding to a relevant uplink radio resource when a secondary cell is configured for the radio terminal UE. Then, after this secondary cell is activated (activation of SCell with configured uplink), the uplink component carrier CC (uplink radio resource) of this secondary cell SCell can be used.

Here, a set of cells that respectively correspond to a plurality of uplink radio resources (component carriers CC) to which the same transmission timing adjustment value (Timing Advance: TA) can be applied (used or shared) is referred to as synchronization group (Timing Advance Group: TA Group). The synchronization group (TA Group) corresponds to the above-described cell group. However, each synchronization group (TA Group) includes one or more cells. That is, each synchronization group (TA Group) may be configured with only one cell. Moreover, a synchronization group (TA Group) that includes the primary cell PCell is referred to as primary synchronization group (Primary TA Group or PCell TA Group), and a synchronization group (TA Group) that includes only secondary cells SCell is referred to as secondary synchronization group (Secondary TA Group or SCell TA Group). The primary synchronization group consists of only the primary cell PCell or consists of the primary cell PCell and one or more secondary cells SCell, and the secondary synchronization group consists of one or more secondary cells SCell. Note that in LTE, information indicating a transmission timing adjustment value (TA) is referred to as TA command (Timing Advance Command), which is transmitted as control information (Control Element: CE) on the MAC Layer (Medium Access Control Layer).

In a case where the present invention is provided to such a system, a synchronization timer (Time Alignment Timer: TAT) used to determine whether or not uplink signals of a radio terminal UE are in synchronization is maintained for each synchronization group. Moreover, as described above, the state (whether or not running) of a synchronization timer for a specific group (specific synchronization group) is associated with uplink data transmission on the cells of a non-specific group (non-specific synchronization group) other than the specific group. On the other hand, the synchronization timers TAT are controlled independently for the specific group and the non-specific group. The specific group and the non-specific group can correspond to the primary synchronization group and the secondary synchronization group, respectively.

Note that "associate" the synchronization timer for the specific group (primary synchronization group) with uplink data transmission in the specific group (primary synchronization group) and in the non-specific group (secondary synchronization group) is as described already. Independent control of the synchronization timers for the specific group (primary synchronization group) and the non-specific group (secondary synchronization group) indicates that, for example, the starting/restarting and stopping of the synchronization timer for each group are performed depending on the reception status of a transmission timing adjustment value TA for each group.

Figure 13:
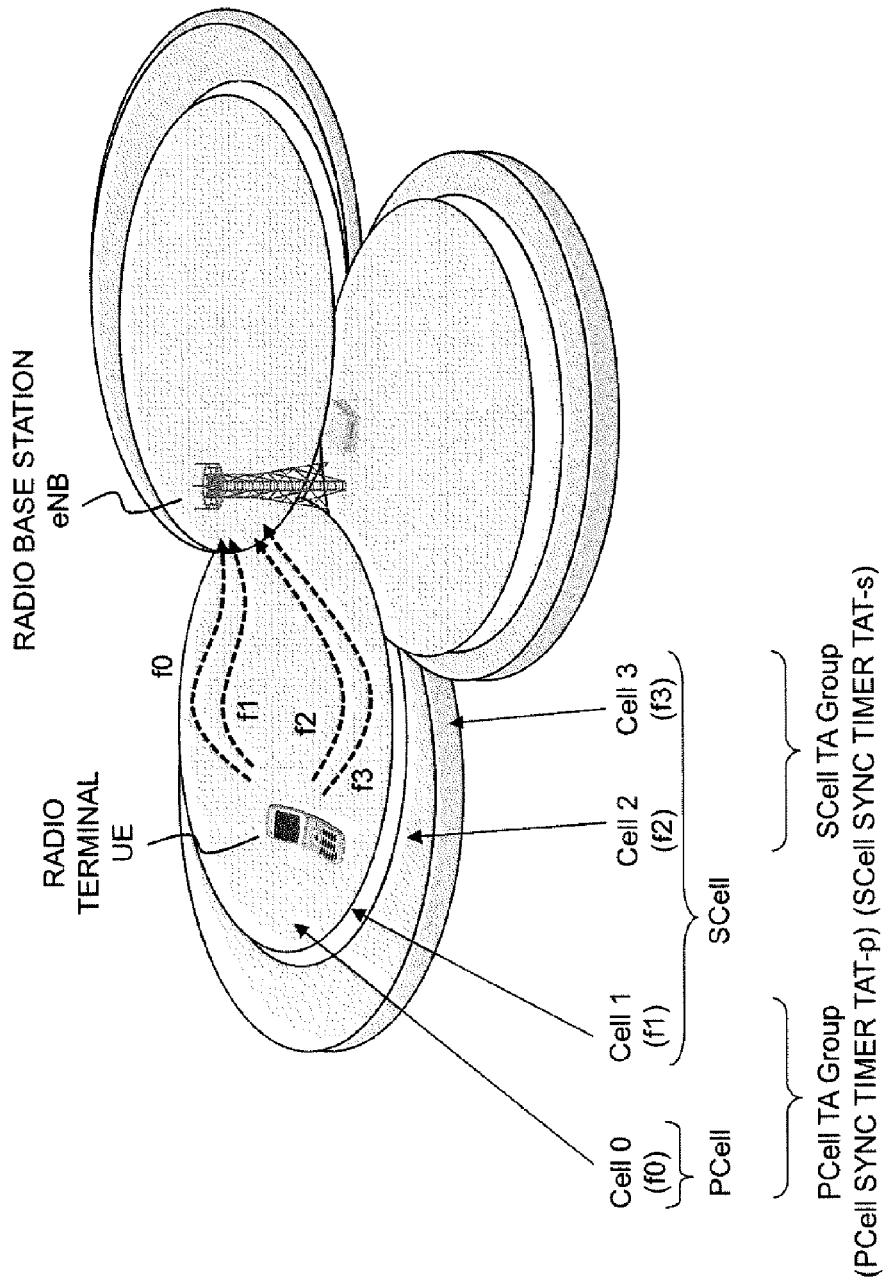
FIG. 13 is a schematic diagram showing an example of synchronization groups for describing carrier aggregation in a radio communication system that is a concrete application example of the present exemplary embodiment.

Referring to FIG. 13, the radio base station eNB manages cells by using four frequency bands f0, f1, f2, and f3, and the radio terminal UE transmits uplink signals by using, at the same time, all or some of an uplink radio resource on a cell 0 of the frequency band f0 (hereinafter, simply referred to as cell 0), an uplink radio resource on a cell 1 of f1 (hereinafter, simply referred to as cell 1), an uplink radio resource on a cell 2 of f2 (hereinafter, simply referred to as cell 2), and an uplink radio resource on a cell 3 of f3 (hereinafter, simply referred to as cell 3). Here, it is assumed that the cell 0 is a primary cell PCell, and the cells 1 to 3 are secondary cells SCell. Moreover, it is assumed that the cells 0 and 1 that have the same propagation delays (propagation characteristics) comprise a primary synchronization group, and the cells 2 and 3 that similarly have the same propagation delays (propagation characteristics) comprise a secondary synchronization group.

In third and fourth examples to be described below, an uplink signal from the cell 0, which is the primary cell PCell of the primary synchronization group, or from the cell 1, which is the secondary cell SCell thereof, will simply be referred to as "uplink signal from the primary synchronization group," and an uplink signal from the cell 2 or the cell 3, which are the secondary cells SCell of the secondary synchronization group, will simply be referred to as "uplink signal from the secondary synchronization group." Moreover, unless otherwise explained, uplink signals on the cells 0 and 1 will not be differentiated from each other. Similarly, uplink signals on the cells 2 and 3 will not be differentiated from each other.

6. Third Example

Next, a description will be given of a method for controlling synchronization timers used to determine uplink-signal synchronization at the time of carrier aggregation (CA), by taking a system shown in FIG. 13 as an example. Note that in a third example of the present invention, the synchronization timer 1 (107p) and the synchronization timer 2 (107s) of the radio base station eNB shown in FIG. 7 correspond to a primary synchronization timer TAT-p for a primary synchronization group and to a secondary synchronization timer TAT-s for a secondary synchronization group, respectively, and the synchronization timer 1 (210p) and the synchronization timer 2 (210s) of the radio terminal UE shown in FIG. 8 correspond to a primary synchronization timer TAT-p for the primary synchronization group and to a secondary synchronization timer TAT-s for the secondary synchronization group, respectively.

In the present example, the primary synchronization timer for the primary synchronization group and the secondary synchronization timer for the secondary synchronization group are controlled independently. Accordingly, even when the primary synchronization timer expires, the secondary synchronization timer is left continuously running (is not stopped) if the secondary synchronization timer has not expired. However, in this case, even if the secondary synchronization timer is running, uplink-signal transmission is not performed in the secondary synchronization group. Note that even after a synchronization timer expires, uplink access signals for random access and the like can be transmitted as necessary. Moreover, a reason for giving attention here to the case where the primary synchronization timer for the primary synchronization group to which the primary cell belong expires, is that in LTE, a physical channel (Physical Uplink Control Channel: PUCCH) for transmitting uplink control signals concerning the Physical Layer and the MAC Layer (Medium Access Control Layer) can be used only on the primary cell, and therefore uplink-signal synchronization on the primary cell is most important.

6.1) Synchronization Timer Control

Figure 14:
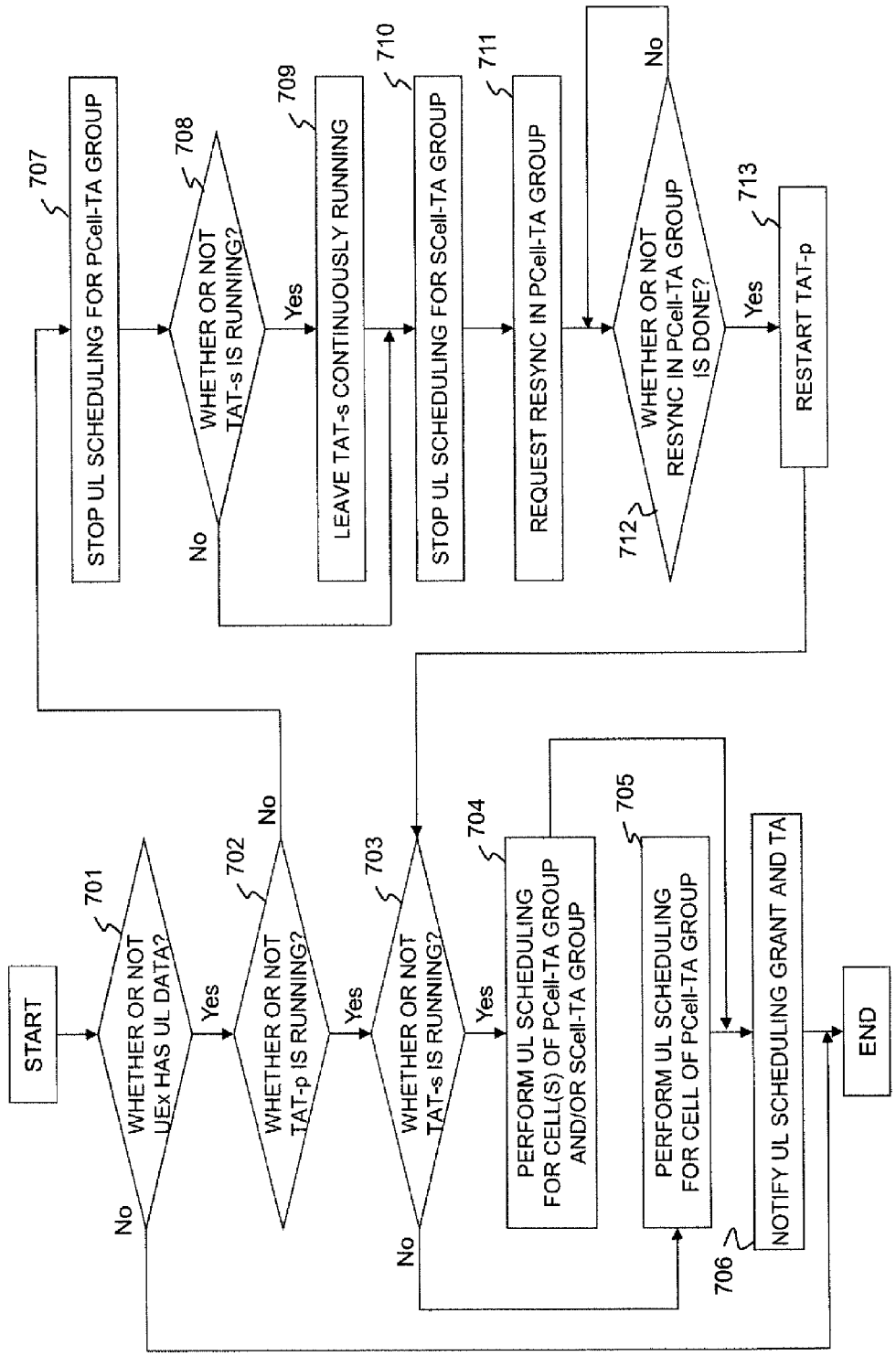
FIG. 14 is a flowchart showing a method for synchronization timer control at a radio base station according to a third example of the present invention.

Referring to FIG. 14, at the radio base station eNB, it is determined based on, for example, a transmission buffer status report (Buffer Status Report: BSR) whether or not a radio terminal UEx that is a control target has (untransmitted) uplink data to transmit (Step 701), and when the radio terminal UEx has uplink data (Step 701; Yes), it is determined whether or not the primary synchronization timer (TAT-p) is running (Step 702). If the primary synchronization timer (TAT-p) is running (Step 702; Yes), it is similarly determined whether or not the secondary synchronization timer (TAT-s) is running (Step 703).

If the secondary synchronization timer (TAT-s) is also running (Step 703; Yes), uplink scheduling is performed for a cell or cells of the primary synchronization group and/or the secondary synchronization group depending on the amount of the uplink data (Step 704), and a scheduling grant indicating a result of scheduling and (if necessary) a transmission timing adjustment value TA are transmitted (Step 706). If the secondary synchronization timer (TAT-s) is not running (expires) (Step 703; No), uplink scheduling is performed for a cell of the primary synchronization group (Step 705), and a scheduling grant indicating a result of scheduling and (if necessary) a transmission timing adjustment value TA are transmitted (Step 706).

On the other hand, if the primary synchronization timer (TAT-p) is not running (expires) (Step 702; No), uplink scheduling for the primary synchronization group is stopped (is not performed thereafter) (Step 707). Subsequently, it is determined whether or not the secondary synchronization timer (TAT-s) is running (Step 708) and, if it is running (Step 708; Yes), it is not stopped along with the expiry of the primary synchronization timer (TAT-p) but is left continuously running (Step 709), while uplink scheduling for the secondary synchronization group is stopped (is not performed thereafter) (Step 710). Then, a request for uplink resynchronization in the primary synchronization group is made to the radio terminal UEx (Step 711). When uplink resynchronization in the primary synchronization group is done (Step 712; Yes), the primary synchronization timer (TAT-p) is restarted (Step 713), and the process moves to Step 703 and similar processing is repeated thereafter.

Figure 15:
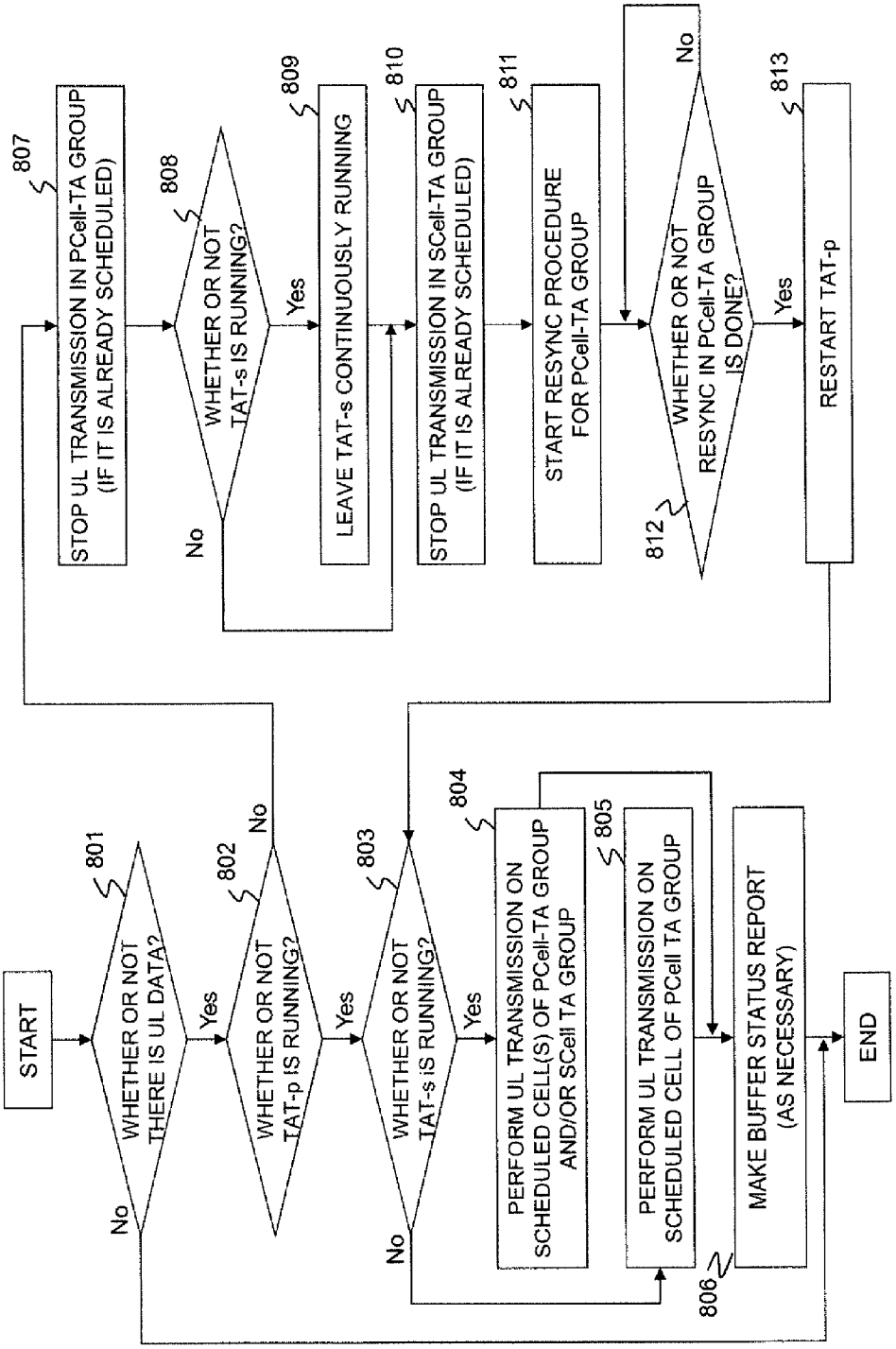
FIG. 15 is a flowchart showing a method for synchronization timer control at a radio terminal according to the third example of the present invention.

Referring to FIG. 15, at the radio terminal UEx, it is determined whether or not (untransmitted) uplink data to be transmitted is maintained (Step 801), and when uplink data is maintained (Step 801; Yes), it is determined whether or not the primary synchronization timer (TAT-p) is running (Step 802).

If the primary synchronization timer (TAT-p) is running (Step 802; Yes), it is similarly determined whether or not the secondary synchronization timer (TAT-s) is running (Step 803). If the secondary synchronization timer (TAT-s) is also running (Step 803; Yes), a scheduling grant indicating a result of scheduling is received (not shown), and uplink data transmission is performed on a cell or cells of the primary synchronization group and/or the secondary synchronization group scheduled (Step 804). If the secondary synchronization timer (TAT-s) is not running (expires) (Step 803; No), uplink data transmission is performed on a cell of the primary synchronization group scheduled (Step 805). The radio terminal UEx makes a buffer status report (BSR) as necessary along with uplink data transmission (Step 806).

On the other hand, if the primary synchronization timer (TAT-p) is not running (expires) (Step 802; No), uplink transmission in the primary synchronization group (if it is already scheduled) is stopped (is not performed thereafter) (Step 807). Subsequently, it is determined whether or not the secondary synchronization timer (TAT-s) is running (Step 808), and if it is running (Step 808; Yes), it is not stopped along with the expiry of the primary synchronization timer (TAT-p) but is left continuously running (Step 809), while uplink transmission in the secondary synchronization group (if it is already scheduled) is stopped (is not performed thereafter) (Step 810).

Subsequently, processing for uplink resynchronization in the primary synchronization group is started (Step 811), and when uplink resynchronization in the primary synchronization group is done (Step 812; Yes), the primary synchronization timer (TAT-p) is restarted (Step 813), and the process moves to Step 803. In this event, if the secondary synchronization timer (TAT-s) is still running when uplink resynchronization in the primary synchronization group is accomplished, uplink transmission can be restarted in the secondary synchronization group without awaiting processing for uplink resynchronization. Thereafter, similar processing is repeated.

6.2) Effects

As described above, according to the third example of the present invention, even in a case where there are a plurality of synchronization groups each having independent uplink-signal transmission timing, a radio terminal UE can appropriately perform synchronization timer control by using synchronization timers corresponding to the respective synchronization groups. Moreover, even when resynchronization is accomplished after the primary synchronization timer (TAT-p) is once expired, it is possible to suppress (avoid) a delay until uplink transmission is restarted on a cell of the secondary synchronization group if the secondary synchronization timer (TAT-s) has been running since the expiry of the primary synchronization timer (TAT-p) up until the restart thereof.

7. Fourth Example

Next, attention will be given to a method for controlling the secondary synchronization timer (TAT-s) for the secondary synchronization group and uplink-signal transmission therein when the primary synchronization timer (TAT-p) for the primary synchronization group expires. In synchronization timer control according to a fourth example of the present invention, if the secondary synchronization timer (TAT-s) is still running even when the primary synchronization timer (TAT-p) expires, uplink data transmission on the cells of the secondary synchronization group is stopped, but transmission of predetermined control signals and/or known signals is enabled. Hereinafter, as an example of the known signals, a sounding reference signal (Sounding Reference Signal: SRS) in LTE will be assumed.

Figure 16:
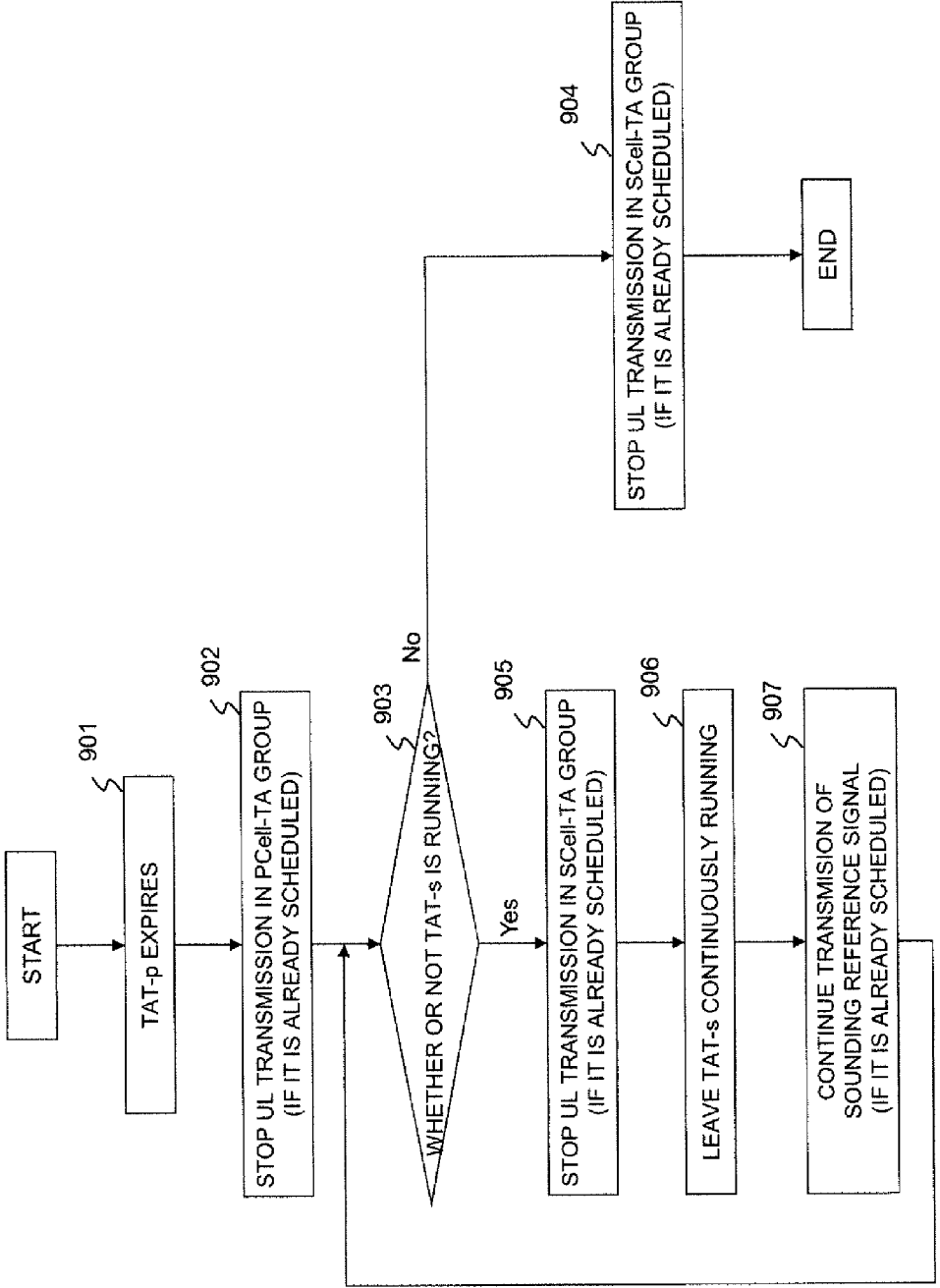
FIG. 16 is a flowchart showing a method for synchronization timer control at the radio terminal according to a fourth example of the present invention.

Referring to FIG. 16, at the radio terminal UEx, when the primary synchronization timer (TAT-p) expires (Step 901), uplink transmission on the cells of the primary synchronization group (if it is already scheduled) is stopped (is not performed thereafter) (Step 902).

Subsequently, it is determined whether or not the secondary synchronization timer (TAT-s) is running (Step 903). When the secondary synchronization timer (TAT-s) is not running either (expires) (Step 903; No), uplink transmission on the cells of the secondary synchronization group (if it is already scheduled) is stopped (is not performed thereafter) (Step 904).

On the other hand, if the secondary synchronization timer (TAT-s) is running (Step 903; Yes), uplink data transmission on the cells of the secondary synchronization group (if it is already scheduled) is stopped (is not performed thereafter) (Step 905). However, the secondary synchronization timer (TAT-s) is left continuously running (Step 906). Then, while the secondary synchronization timer (TAT-s) is running, transmission of uplink sounding reference signals (SRS) (if it is already scheduled) is continued on the cells of the secondary synchronization group (Step 907). Then, the process goes back to Step 903 and the above-described processing is repeated.

As described above, according to the fourth example of the present invention, even when uplink synchronization is lost in the primary synchronization group, since transmission of uplink sounding reference signals (SRS) is continued as long as uplink synchronization in the secondary synchronization group is maintained, the radio base station eNB can check the quality of uplink communication and confirm uplink synchronization on the cells of the secondary synchronization group. Thereby, it is also possible to appropriately perform scheduling for uplink data transmission on a cell of the secondary synchronization group after uplink resynchronization in the primary synchronization group is accomplished. Furthermore, the radio base station eNB can also perform checking as to whether or not the radio terminal UE is still present in a cell covered by itself, and the like.

9. Other Examples

In the hitherto-described embodiment and examples, a description is made on the premise that the physical channel (PUCCH) transmitting (some of) uplink control signals concerning the Physical Layer and the MAC Layer can be used only on a primary cell. However, the present invention is not limited to this, but can also be applied in a case where the physical channel (PUCCH) transmitting such uplink control signals is used on a secondary cell. For example, in a case where the physical channel (PUCCH) can be used on at least one cell of each synchronization group, it is also possible to allow transmission of uplink signals, irrespective of their types, to be performed or continued in a certain synchronization group as long as uplink-signal synchronization is maintained on the cell of this synchronization group, regardless of uplink-signal synchronization on the primary cell.

Moreover, conceivable methods for configuring a synchronization group (TA Group) are as follows.

First, for carrier aggregation (CA) in LTE, serving cell indexes (ServCellIndex) are defined to correspond to individual cells. For example, a serving cell index "0" is assigned to a primary cell (PCell), and serving cell indexes "1 to 7" are respectively assigned to secondary cells (SCell). Further, secondary cell indexes (SCellIndex) are also defined. Secondary indexes "1 to 7" correspond to the serving cell indexes "1 to 7" respectively. Since a primary cell always has the serving cell index "0," a radio base station (eNB) does not particularly notify a radio terminal (UE) of information about the serving cell index of the primary cell. However, each secondary cell index is notified from a radio base station (eNB) to a radio terminal (UE) when a secondary cell is configured (configure SCell).

Here, for a method for configuring a synchronization group (TA Group), when secondary cells are configured, that is, when secondary cell indexes are notified, a synchronization group index (number) (TA Group Index or TA Group ID) may be notified from a radio base station (eNB) to a radio terminal (UE), or information about a synchronization group index and corresponding cells or frequencies may be broadcast or individually notified to radio terminals (UEs) in the cells. Note that a synchronization group index may be notified only when configuration of an uplink radio resource (component carrier CC) corresponding to a secondary cell of interest is involved. Moreover, it is conceivable that a synchronization group index of a primary synchronization group (PCell TA Group) including a primary cell is set for "0" and synchronization group indexes of secondary synchronization groups (SCell TA Groups) are set for consecutive numbers starting from "1," but the present invention is not limited to this.

Furthermore, in the hitherto-discussed examples, a description has been given with 3GPP LTE in mind for the radio communication systems. However, the targets of the present invention are not limited to these but can be applied to GSM (Global System for Mobile communications), UMTS (Universal Mobile Telecommunications System), WiMAX (Worldwide interoperability for Microwave Access), and the like.

INDUSTRIAL APPLICABILITY

The present invention is applicable to transmission timing control in radio communication systems such 3GPP LTE, GSM, UMTS, and the like.

REFERENCE SIGNS LIST

10 Radio base station
101 Reception section
102 Demodulation section
103 Upper layer
104 Timing control unit (UEx)
105 Transmission signal generation section
106 Transmission section
107$p$ Synchronization timer (TAT1)
107$s$ Synchronization timer (TAT2)
108 TA1 calculation and retention section
109 TA2 calculation and retention section
20 Radio terminal
201 Reception section
202 Demodulation section
203 Upper layer
204 Timing control unit
205 Transmission signal generation section
206 Transmission section
208 TA1 management unit
209 TA2 management unit
210 Synchronization timer (TAT1)
211 Synchronization timer (TAT2)

The invention claimed is:

1. A radio terminal capable of uplink carrier aggregation using at least a first Timing Advance Group and a second Timing Advance Group, wherein each of the first and second Timing Advance Groups comprises at least one serving cell, comprising:
   a transmitter configured to transmit uplink signals;
      a first Time Alignment Timer associated with the first Timing Advance Group, wherein the first Time Alignment Timer is used to control whether uplink transmission from the transmitter in a serving cell of the first Timing Advance Group is synchronized with a radio station;
      a second Time Alignment Timer associated with the second Timing Advance Group, wherein the second Time Alignment Timer is used to control whether uplink transmission from the transmitter in a serving cell of the second Timing Advance Group is synchronized with the radio station; and
   a controller configured to permit the second Time Alignment Timer to run when the first Time Alignment Timer expires, and to stop uplink data transmission on all cells when the first Time Alignment Timer stops even if the second Time Alignment Timer is running.

2. The radio terminal according to claim 1, wherein the first Timing Advance Group is a Primary Timing Advance Group including a primary cell.

3. The radio terminal according to claim 2, wherein the first Time Alignment Timer and the second Time Alignment Timer are started and stopped separately.

4. The radio terminal according to claim 2, wherein the first Time Alignment Timer is started or restarted when the radio terminal receives a Timing Advance value associated with the first Timing Advance Group and the second Time Alignment Timer is started or restarted when the radio terminal receives a Timing Advance value associated with the second Timing Advance Group.

5. The radio terminal according to claim 1, wherein the first Time Alignment Timer and the second Time Alignment Timer are started and stopped separately.

6. The radio terminal according to claim 1, wherein the first Time Alignment Timer is started or restarted when the radio terminal receives a Timing Advance value associated with the first Timing Advance Group and the second Time Alignment Timer is started or restarted when the radio terminal receives a Timing Advance value associated with the second Timing Advance Group.

7. A transmission control method in a radio terminal capable of uplink carrier aggregation using at least a first Timing Advance Group and a second Timing Advance Group, wherein each of the first and second Timing Advance Groups comprises at least one serving cell, wherein the radio terminal comprises a transmitter configured to transmit uplink signals, the method comprising:
 controlling whether uplink transmission from the transmitter in a serving cell of the first Timing Advance Group is synchronized with a radio station using a first Time Alignment Timer associated with the first Timing Advance Group;
 controlling whether uplink transmission from the transmitter in a serving cell of the second Timing Advance Group is synchronized with the radio station using a second Time Alignment Timer associated with the second Timing Advance Group;
 permitting the second Time Alignment Timer to run when the first Time Alignment Timer expires; and
 stopping uplink data transmission on all cells when the first Time Alignment Timer stops even if the second Time Alignment Timer is running.

8. The transmission control method according to claim 7, wherein the first Timing Advance Group is a Primary Timing Advance Group including a primary cell.

9. The transmission control method according to claim 8, wherein the first Time Alignment Timer and the second Time Alignment Timer are started and stopped separately.

10. The transmission control method according to claim 8, wherein the first Time Alignment Timer is started or restarted when the radio terminal receives a Timing Advance value associated with the first Timing Advance Group and the second Time Alignment Timer is started or restarted when the radio terminal receives a Timing Advance value associated with the second Timing Advance Group.

11. The transmission control method according to claim 7, wherein the first Time Alignment Timer and the second Time Alignment Timer are started and stopped separately.

12. The transmission control method according to claim 7, wherein the first Time Alignment Timer is started or restarted when the radio terminal receives a Timing Advance value associated with the first Timing Advance Group and the second Time Alignment Timer is started or restarted when the radio terminal receives a Timing Advance value associated with the second Timing Advance Group.

13. A radio station configured to communicate with a radio terminal capable of uplink carrier aggregation using at least a first Timing Advance Group and a second Timing Advance Group, wherein each of the first and second Timing Advance Groups comprises at least one serving cell, comprising:
 a processor configured to execute a transmission signal generator to generate at least one of a first value of a first Time Alignment Timer associated with the first Timing Advance Group and a second value of a second Time Alignment Timer associated with the second Timing Advance Group, wherein the first Time Alignment Timer is used to control whether uplink transmission of the radio terminal in a serving cell of the first Timing Advance Group is synchronized with the radio station, wherein the second Time Alignment Timer is used to control whether uplink transmission of the radio terminal in a serving cell of the second Timing Advance Group is synchronized with the radio station, wherein the radio terminal is configured to permit the second Time Alignment Timer to run when the first Time Alignment Timer expires, and to stop uplink data transmission on all cells when the first Time Alignment Timer stops even if the second Time Alignment Timer is running; and
 a transmitter configured to transmit at least one of the first value of the first Time Alignment Timer and the second value of the second Time Alignment Timer to the radio terminal.

14. The radio station according to claim 13, wherein the first Timing Advance Group is a Primary Timing Advance Group including a primary cell.

15. The radio station according to claim 14, wherein the first Time Alignment Timer and the second Time Alignment Timer are started and stopped separately.

16. The radio station according to claim 13, wherein the first Time Alignment Timer and the second Time Alignment Timer are started and stopped separately.

17. A scheduling control method in a radio station configured to communicate with a radio terminal capable of uplink carrier aggregation using at least a first Timing Advance Group and a second Timing Advance Group, wherein each of the first and second Timing Advance Groups comprises at least one serving cell, the method comprising:
 generating at least one of a first value of a first Time Alignment Timer associated with the first Timing Advance Group and a second value of a second Time Alignment Timer associated with the second Timing Advance Group, wherein the first Time Alignment Timer is used to control whether uplink transmission of the radio terminal in a serving cell of the first Timing Advance Group is synchronized with the radio station, wherein the second Time Alignment Timer is used to control whether uplink transmission of the radio terminal in a serving cell of the second Timing Advance Group is synchronized with the radio station;
 permitting the second Time Alignment Timer to run when the first Time Alignment Timer expires;
 stopping uplink data transmission on all cells when the first Time Alignment Timer stops even if the second Time Alignment Timer is running; and
 transmitting at least one of the first value of the first Time Alignment Timer and the second value of the second Time Alignment Timer to the radio terminal.

18. The scheduling control method according to claim 17, wherein the first Timing Advance Group is a Primary Timing Advance Group including a primary cell.

19. The scheduling control method according to claim 18, wherein the first Time Alignment Timer and the second Time Alignment Timer are started and stopped separately.

20. The scheduling control method according to claim 17, wherein the first Time Alignment Timer and the second Time Alignment Timer are started and stopped separately.

21. A radio communication system comprising a radio station and a radio terminal, wherein the radio terminal is capable of uplink carrier aggregation using at least a first Timing Advance Group and a second Timing Advance Group, wherein each of the first and second Timing Advance Groups comprises at least one serving cell, wherein the radio terminal comprises:

a transmitter configured to transmit uplink signals;
a memory storing:
- a first Time Alignment Timer associated with the first Timing Advance Group, wherein the first Time Alignment Timer is used to control whether uplink transmission from the transmitter in a serving cell of the first Timing Advance Group is synchronized with the radio station;
- a second Time Alignment Timer associated with the second Timing Advance Group, wherein the second Time Alignment Timer is used to control whether uplink transmission from the transmitter in a serving cell of the second Timing Advance Group is synchronized with the radio station; and
- a controller configured to permit the second Time Alignment Timer to run when the first Time Alignment Timer expires, and to stop uplink data transmission on all cells when the first Time Alignment Timer stops even if the second Time Alignment Timer is running.

22. The radio communication system according to claim 21, wherein the first Timing Advance Group is a Primary Timing Advance Group including a primary cell.

23. The radio communication system according to claim 22, wherein the first Time Alignment Timer and the second Time Alignment Timer are started and stopped separately.

24. The radio communication system according to claim 22, wherein the first Time Alignment Timer is started or restarted when the radio terminal receives a Timing Advance value associated with the first Timing Advance Group and the second Time Alignment Timer is started or restarted when the radio terminal receives a Timing Advance value associated with the second Timing Advance Group.

25. The radio communication system according to claim 21, wherein the first Time Alignment Timer and the second Time Alignment Timer are started and stopped separately.

26. The radio communication system according to claim 21, wherein the first Time Alignment Timer is started or restarted when the radio terminal receives a Timing Advance value associated with the first Timing Advance Group and the second Time Alignment Timer is started or restarted when the radio terminal receives a Timing Advance value associated with the second Timing Advance Group.

* * * * *